(12) United States Patent
Schlanger

(10) Patent No.: US 11,407,470 B2
(45) Date of Patent: Aug. 9, 2022

(54) VEHICLE WHEEL AXLE ASSEMBLY

(71) Applicant: Raphael Schlanger, Wilton, CT (US)

(72) Inventor: Raphael Schlanger, Wilton, CT (US)

( * ) Notice: Subject to any disclaimer, the term of this patent is extended or adjusted under 35 U.S.C. 154(b) by 469 days.

(21) Appl. No.: 16/517,552

(22) Filed: Jul. 20, 2019

(65) Prior Publication Data
US 2020/0017162 A1 Jan. 16, 2020

Related U.S. Application Data

(63) Continuation-in-part of application No. 16/377,167, filed on Apr. 6, 2019, now Pat. No. 11,001,333, which is a continuation-in-part of application No. 15/681,410, filed on Aug. 20, 2017, now Pat. No. 10,676,149, which is a continuation-in-part of application No. 14/974,451, filed on Dec. 18, 2015, now Pat. No. 9,758,209, and a continuation-in-part of application No. 14/974,228, filed on Dec. 18, 2015, now abandoned, said application No. 14/974,451 is a continuation-in-part of application No. 14/958,263, filed on Dec. 3, 2015, now Pat. No. 10,112,439, which is a continuation-in-part of application No. 14/952,645, filed on Nov. 25, 2015, now Pat. No. 9,815,329, which is a continuation-in-part of application No. 14/602,543, filed on Jan. 22, 2015, now Pat. No. 9,561,833, which is a continuation-in-part of application No. 13/914,490,
(Continued)

(51) Int. Cl.
*B62K 25/02* (2006.01)

(52) U.S. Cl.
CPC ........ *B62K 25/02* (2013.01); *B60B 2900/541* (2013.01); *B62K 2206/00* (2013.01)

(58) Field of Classification Search
CPC ..... B60B 27/023; B60B 27/026; B62K 25/02; B62K 2206/00
See application file for complete search history.

(56) References Cited

U.S. PATENT DOCUMENTS

| 6,089,675 A | 7/2000 | Schlanger |
| 2002/0067069 A1* | 6/2002 | Kanehisa ............ B60B 27/0078 301/110.5 |

(Continued)

FOREIGN PATENT DOCUMENTS

EP  0890505 A1 * 1/1999 ........... B60B 27/026

*Primary Examiner* — Kip T Kotter

(57) ABSTRACT

A vehicle wheel axle assembly having: an axle sleeve with first and second end faces and an axial opening having a radially inwardly projecting first engagement surface; and a control shaft with a radially outwardly projecting second engagement surface. The control shaft is axially retained to the axle sleeve by an overlie engagement at an engagement interface between the first and second engagement surfaces to limit the axial displacement of the control shaft in a retracting direction relative to the axle sleeve. At least one of: the first engagement surface is in an engagement element discreet from and axially retained to the axle sleeve such that the engagement element may be installed to the axle sleeve and/or removed from the axle sleeve; and the second engagement surface is in an engagement element discreet from and axially retained to the control shaft such that the engagement element may be installed to the control shaft and/or removed from the control shaft.

20 Claims, 13 Drawing Sheets

Related U.S. Application Data filed on Jun. 10, 2013, now Pat. No. 9,446,626, which is a continuation-in-part of application No. 12/655,433, filed on Dec. 30, 2009, now Pat. No. 8,485,335.

(60) Provisional application No. 62/700,925, filed on Jul. 20, 2018, provisional application No. 62/653,575, filed on Apr. 6, 2018, provisional application No. 62/381,155, filed on Aug. 30, 2016, provisional application No. 62/124,391, filed on Dec. 18, 2014, provisional application No. 61/965,201, filed on Jan. 27, 2014, provisional application No. 61/204,130, filed on Jan. 2, 2009.

(56) References Cited

U.S. PATENT DOCUMENTS

| | | | | |
|---|---|---|---|---|
| 2008/0185908 A1* | 8/2008 | Hara | ........................ | B60B 35/04 |
| | | | | 301/124.2 |
| 2008/0315678 A1* | 12/2008 | Watarai | ................. | B60B 35/004 |
| | | | | 301/110.5 |
| 2009/0115241 A1* | 5/2009 | Kanehisa | ............... | B62K 25/02 |
| | | | | 301/124.2 |

* cited by examiner

VEHICLE WHEEL AXLE ASSEMBLY

CROSS-REFERENCE TO RELATED APPLICATION

This application claims priority of U.S. Provisional Patent Application 62/700,925, filed Jul. 20, 2018.

This application is also a Continuation-In-Part of U.S. patent application Ser. No. 16/377,167 filed Apr. 6, 2019, which was issued as U.S. Pat. No. 11,001,353 on May 11, 2021.

U.S. patent application Ser. No. 16/377,167 claims priority of U.S. Provisional Patent Application 62/653,575, filed Apr. 6, 2018, which has expired.

U.S. patent application Ser. No. 16/377,167 is a Continuation-In-Part of U.S. patent application Ser. No. 15/681,410, filed Aug. 20, 2017, which was issued as U.S. Pat. No. 10,676,149 on Jun. 9, 2020.

U.S. patent application Ser. No. 15/681,410 claims priority of U.S. Provisional Patent Application 62/381,155, filed Aug. 30, 2016 and entitled "VEHICLE WHEEL AXLE ASSEMBLY", which has expired.

U.S. patent application Ser. No. 15/681,410 is also a Continuation-In-Part of U.S. patent application Ser. No. 14/974,228, filed Dec. 18, 2015, which is abandoned.

U.S. patent application Ser. No. 15/681,410 is also a Continuation-In-Part of U.S. patent application Ser. No. 14/974,451, filed Dec. 18, 2015, which was issued as U.S. Pat. No. 9,758,209 on Sep. 12, 2017.

U.S. patent application Ser. No. 14/974,451 claimed priority of U.S. Provisional Patent Application 62/124,391, filed Dec. 18, 2014, which has since expired.

U.S. patent application Ser. No. 14/974,451 is also a Continuation-In-Part of U.S. patent application Ser. No. 14/958,263 filed Dec. 3, 2015, which was issued as U.S. Pat. No. 10,112,439 on Oct. 30, 2018.

U.S. patent application Ser. No. 14/958,263 is a Continuation-In-Part of U.S. patent application Ser. No. 14/952,645 filed Nov. 25, 2015, which was issued as U.S. Pat. No. 9,815,329 on Nov. 14, 2017.

U.S. patent application Ser. No. 14/952,645 is a Continuation-In-Part of U.S. patent application Ser. No. 14/602,543 filed Jan. 22, 2015, which is which was issued as U.S. Pat. No. 9,561,833 on Feb. 2, 2017.

U.S. patent application Ser. No. 14/602,543 claimed priority of U.S. Provisional Patent Application 61/965,201 filed Jan. 27, 2014, which has since expired.

U.S. patent application Ser. No. 14/602,543 is also a Continuation-In-Part of U.S. patent application Ser. No. 13/914,490 filed Jun. 10, 2013, which was issued as U.S. Pat. No. 9,446,626 on Sep. 20, 2016.

U.S. patent application Ser. No. 13/914,490 is a Continuation-In-Part of U.S. patent application Ser. No. 12/655,433 filed Dec. 30, 2009, which was issued as U.S. Pat. No. 8,485,335 on Jul. 16, 2013.

U.S. patent application Ser. No. 12/655,433 claimed priority of U.S. Provisional Patent Application 61/204,130 filed Jan. 2, 2009, which has since expired.

BACKGROUND

Field of the Invention

The present invention relates to a vehicle wheel axle assembly. The axle assembly includes an axle sleeve and a control shaft that is axially guided and axially displaceable within the axle sleeve. The axle assembly includes a retaining means that may: control the axial position of the control shaft relative to the axle sleeve; and/or retain the control shaft with the axle sleeve; and/or provide tactile feedback to the operator that may be used to signal the preferred axial position of the control shaft relative to the axle sleeve. Preferably, the control shaft is coaxial and rotatable relative to the axle sleeve.

Discussion of Prior Art

U.S. Pat. No. 6,089,675 describes a vehicle (i.e. bicycle) wheel hub that includes a control shaft that is internally coaxial with an axle sleeve. As illustrated in FIGS. 4a-f of this patent, the control shaft is axially displaceable relative to the axle sleeve, however the control shaft has a blocking engagement with the axle sleeve that prevents the control shaft from being withdrawn and removed from the axle sleeve without completely disassembling the hub assembly.

It is often desirable to remove the control shaft from the axle sleeve in order to service the hub and/or to replace the control shaft with a different type. For example, different bicycles may include dropouts that have different threading or that may be of a different type. In such a case, when swapping wheels and bicycle frames, it may be desirable to also swap out the control shaft to insure compatibility with the dropouts of a given frame. Since the control shaft of U.S. Pat. No. 6,089,675 cannot be removed from the sleeve, the entire axle and/or sleeve assembly must be disassembled in order to replace the control shaft. This is a great inconvenience to the operator since this is a time-consuming procedure and also requires special tools and skills that many operators may not have.

While there are conventional through-axle axle assemblies available, these assemblies lack any means to retain the control shaft with the axle sleeve and the control shaft may easily become inadvertently separated from the axle sleeve. This is an inconvenience for the operator. Further, the control shaft may then become lost or misplaced or damaged. Further, these conventional through-axle assemblies do not require, nor do they provide, any means to control the axial position of the control shaft relative to the axle sleeve.

In certain axle assemblies, such as FIGS. 4a-f of U.S. Pat. No. 6,089,675, it is desirable to provide some means to control the axial position of the control shaft, particularly when positioning the control shaft in the precise axial location such that it may be radially assembled and disassembled to the dropouts. Since conventional through-axle assemblies lack this ability for axial position control, the operator must manually position the control shaft in the proper axial position by trial-and-error in order to install and remove the wheel to/from the dropouts of the frame. For the operator, this adds significant frustration, complexity, and skill requirement to this installation and removal process.

Accordingly, it is an objective of the present invention to overcome the forgoing disadvantages and provide an improved vehicle wheel hub assembly, particularly as applied to a bicycle wheel.

SUMMARY OF THE INVENTION—OBJECTS AND ADVANTAGES

The present invention utilizes an engagement interface between the control shaft and the axle sleeve. This engagement interface is a radially overlapping overlie engagement interface that serves to retain the control shaft with the axle sleeve, and which restricts the control shaft from being inadvertently separated and helps to prevent it from being lost, misplaced, or damaged.

Further, this interface can be utilized to provide a stop to restrain and/or limit the axial travel of the control shaft at a predetermined axial position relative to the axle sleeve. This may serve to control the axial position of the control shaft in the extending direction and/or the retracting direction such that the control shaft is properly axially aligned to provide the requisite clearance to install and remove the wheel to/from the dropouts of the frame.

Still further, this interface may serve to provide tactile feedback to the operator to indicate that the control shaft is in the predetermined axial position relative to the axle sleeve. This provides a helpful convenience for the operator and eliminates the trial-and-error associated with axially positioning the control shaft of conventional through-axle arrangements. In the case where the pre-determined axial position corresponds to the retracted position, this minimizes the operator's frustration, complexity, and skill requirement associated with the wheel installation and removal process.

Yet further, this engagement interface may be selectively removed by over-extending or hyper-extending the control shaft relative to the axle sleeve to permit access to a retainer. The retainer may be removed or otherwise manipulated such that the control shaft may then be withdrawn and removed from the axle sleeve and from the remainder of the hub assembly. Since the control shaft may be withdrawn and removed from the axle sleeve as described, the operator may swap out different control shafts and may easily service and clean the control shaft without completely disassembling the hub assembly.

BRIEF DESCRIPTION OF THE DRAWINGS

The present invention will be more readily understandable from a consideration of the accompanying drawings, wherein:

FIG. 2a is an exploded perspective view of a first embodiment of the present invention, showing the dropouts of the bicycle frame and a hub assembly, including a control shaft shown prior to its assembly with the axle sleeve.

FIG. 2b is a perspective view of the embodiment of FIG. 2a, with the control shaft first assembled to the axle sleeve and with the hub assembly, and with the control shaft shown in a hyper-extended or over-extended position to permit access to the snapring groove therein, and showing the snapring assembled to the snapring groove.

FIG. 2c is a perspective view of the embodiment of FIG. 2a, with the control shaft next shown in the retracted position and with the hub assembly in preparation for its assembly with the dropouts of the frame.

FIG. 2d is a perspective view of the embodiment of FIG. 2a, with the hub assembly next radially pre-assembled to the dropouts, with the control shaft still in the retracted position.

FIG. 2e is a perspective view of the embodiment of FIG. 2a, with the control shaft next displaced to the extended position with the collar portion axially overlapping the left dropout and the engagement end threadably assembled to the right dropout. The hub assembly is now assembled to the dropouts.

FIG. 2f is an exploded axial cross-section view, taken along 124-124, of the embodiment of FIG. 2a, corresponding to the assembly sequence of FIG. 2a, showing the dropouts of the bicycle frame and the hub assembly, including a control shaft shown prior to its assembly with the axle sleeve.

FIG. 2g is a radial cross-section view of the embodiment of FIG. 2a, taken along 124-124, showing the control shaft next inserted within the axle sleeve to a hyper-extended position to permit access to the snapring groove, and with the snapring in preparation for assembly with the snapring groove.

FIG. 2h is a radial cross-section view of the embodiment of FIG. 2a, taken along 124-124, showing the snapring next assembled to the snapring groove in an assembly sequence corresponding to that of FIG. 2b.

FIG. 2i is a radial cross-section view of the embodiment of FIG. 2a, taken along 124-124, with the control shaft next axially displaced to the retracted position, and with the hub assembly in preparation for assembly to the dropouts in an assembly sequence corresponding to that of FIG. 2c.

FIG. 2j is a radial cross-section view of the embodiment of FIG. 2a, taken along 124-124, showing the hub assembly next pre-assembled to the dropouts, with the control shaft still in the retracted position, in an assembly sequence corresponding to that of FIG. 2d.

FIG. 2k is a radial cross-section view of the embodiment of FIG. 2a, taken along 124-124, showing the control shaft next displaced in the extending direction and rotated within the axle sleeve to an engaged position, in an assembly sequence corresponding to that of FIG. 2e, such that the external threads of the control shaft are threadably assembled to the internal threads of the right dropout such that the hub assembly is assembled to the dropouts.

FIG. 2L is a perspective view of the left dropout of the embodiment of FIG. 2a.

DETAILED DESCRIPTION OF THE INVENTION

Figure 1:
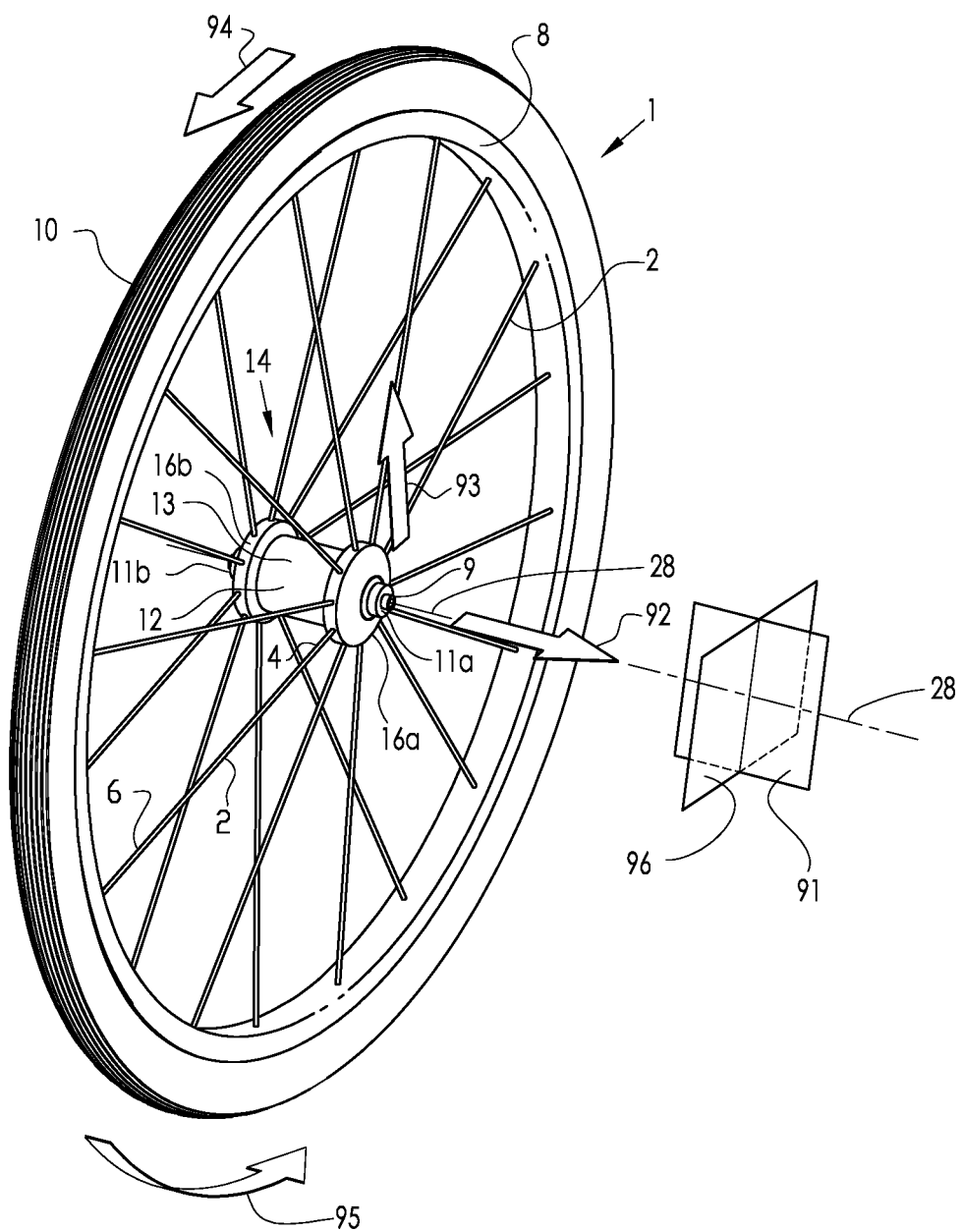
FIG. 1 is a perspective view schematically illustrating the general configuration of a prior art vehicle wheel as applied to a bicycle wheel.

FIG. 1 describes the basic configuration of an exemplary prior art vehicle wheel, in particular, a bicycle wheel 1, as well as a description of the direction conventions used throughout this disclosure. The hub assembly 14 includes a rotatable hub shell 12 and a stationary axle 9, with bearings (not shown) to facilitate rotation of the hub shell 12 about the axial axis 28. The hub shell 12 includes a hub body 13 with at least two axially spaced hub flanges 16a and 16b, each of which include a means for connecting with the spokes (not shown). The axle 9 includes end faces 11a and 11b to interface with the dropouts (not shown). The axial axis 28 is the axial centerline of rotation of the bicycle wheel 1. The hub flanges 16a and 16b may be contiguous with the hub shell 12 or may be separately formed and assembled to the hub body 13 portion of the hub shell 12. The spokes 2 are affixed to the hub flanges 16a or 16b at their first end 4 and extend to attach the rim 8 at their second end 6. The tire 10 is fitted to the outer periphery of the rim 8. The wheel of FIG. 1 is generic and may be of tension-spoke or compression-spoke design.

The axial direction 92 is a direction parallel with the axial axis 28. The radial direction 93 is a direction generally perpendicular to the axial direction 92 and extending generally from the axial axis 28 radially outwardly toward the rim 8. The tangential direction 94 is a direction perpendicular to both the radial direction 93 and axial direction 92, defining a generally tangent vector at a given radius. The circumferential direction 95 is a cylindrical vector that wraps around the axial axis 28 at a given radius. A radial plane 96 is a plane perpendicular to the axial axis 28 that extends in a generally radial direction at a given axial intercept. An axial plane 91 is a plane that is generally parallel to the axial axis.

In the ensuing descriptions, the term "axial" refers to a direction parallel to the centerline of the axial axis 28 and the term "radial" refers to a direction perpendicular to the axial axis 28. An axially inboard (or inward) orientation is an orientation that is axially proximal to the axial midpoint between the two end faces 11a and 11b. Conversely, an axially outboard (or outward) orientation is an orientation that is axially distal to the axial midpoint between the two end faces 11a and 11b. A radially inboard (or inward) orientation is an orientation that is radially proximal to the axial axis 28 and a radially outboard (or outward) orientation is an orientation that is radially distal to the axial axis 28. An axially inboard (or inward) facing surface is a surface that faces toward the axial midpoint between the two end faces 11a and 11b. Conversely, an axially outboard (or outward) facing surface is a surface that faces away from the axial midpoint between the two end faces 11a and 11b.

While it is most common for the hub shell 12 to rotate about a fixed axle 9, there are some cases where it is desirable to permit the axle 9 to be fixed with the wheel 1 such as the case where the wheel 1 is driven by the axle 9.

Figure 2A:
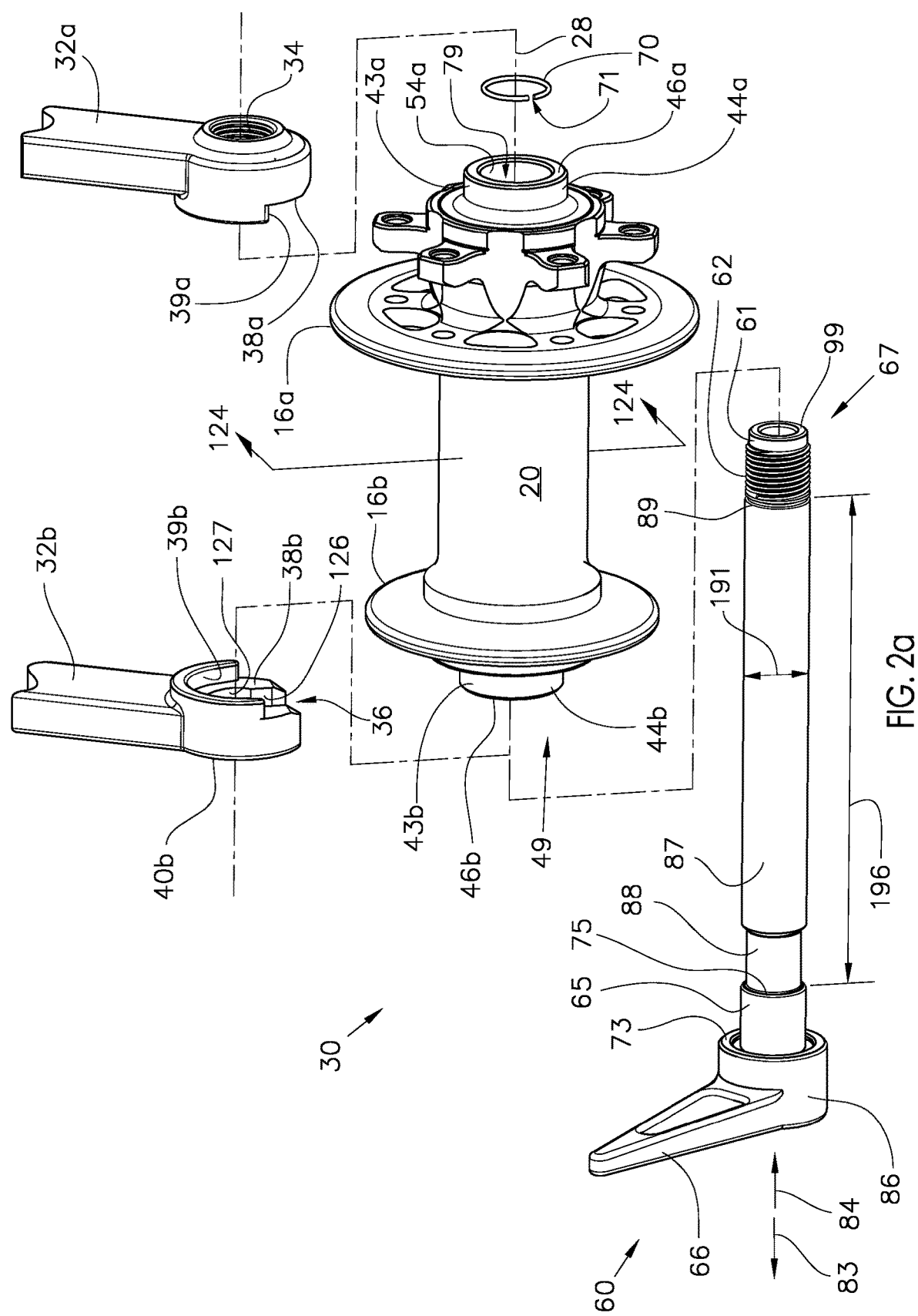
FIGS. 2a-e are perspective views of a first embodiment of the present invention, showing the sequential steps involved in assembling the control shaft to the remainder of the hub assembly and then assembling this hub assembly to the frame of a bicycle.
Figure 2B:
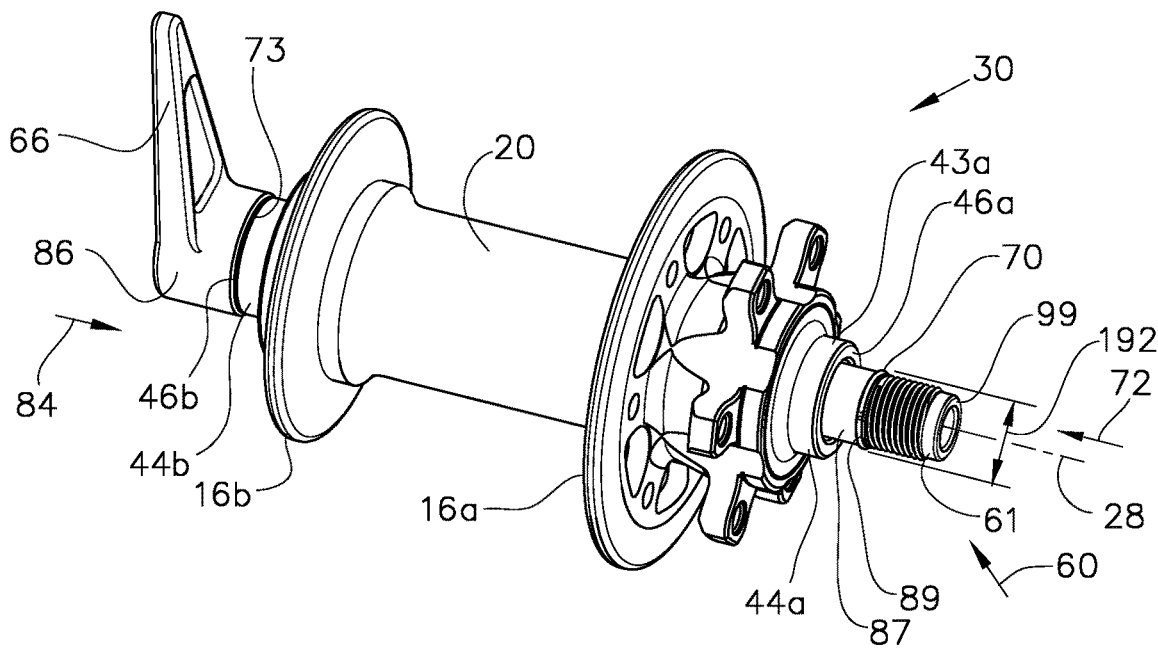
Figure 2C:
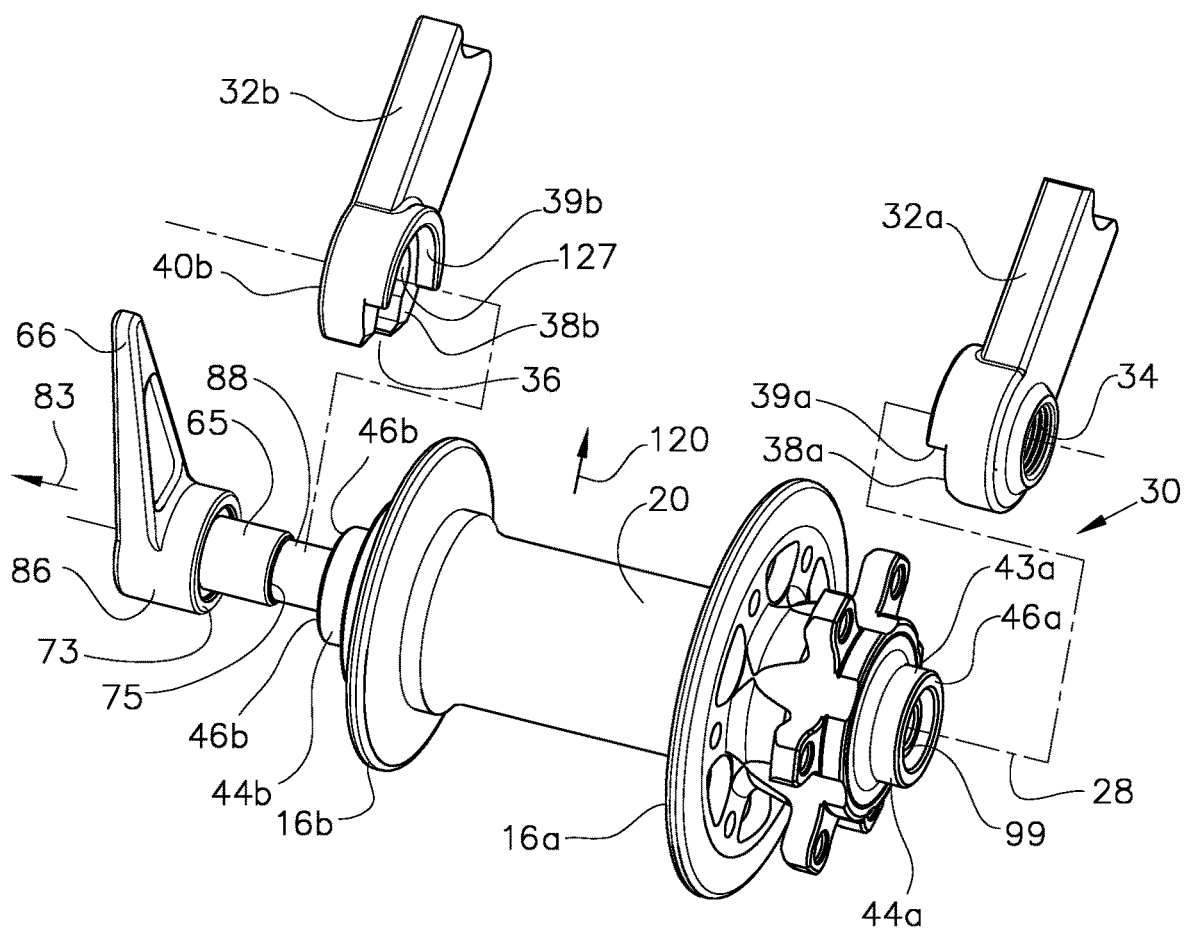
Figure 2D:
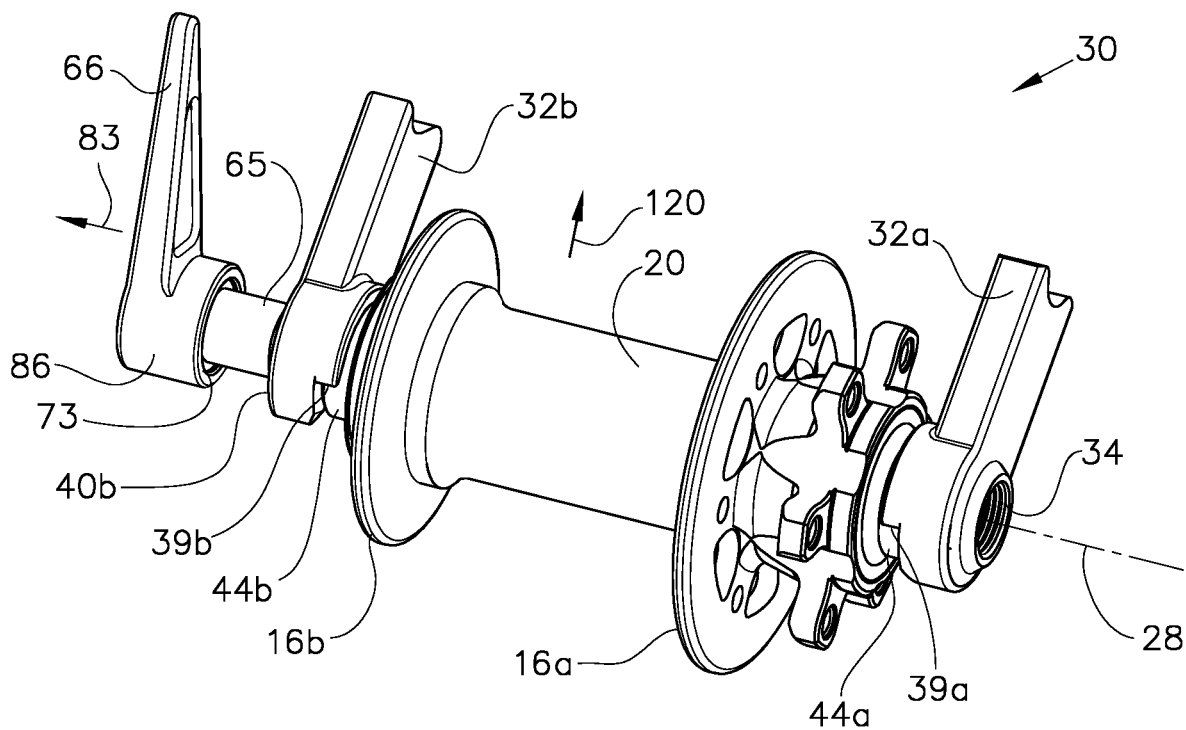
Figure 2E:
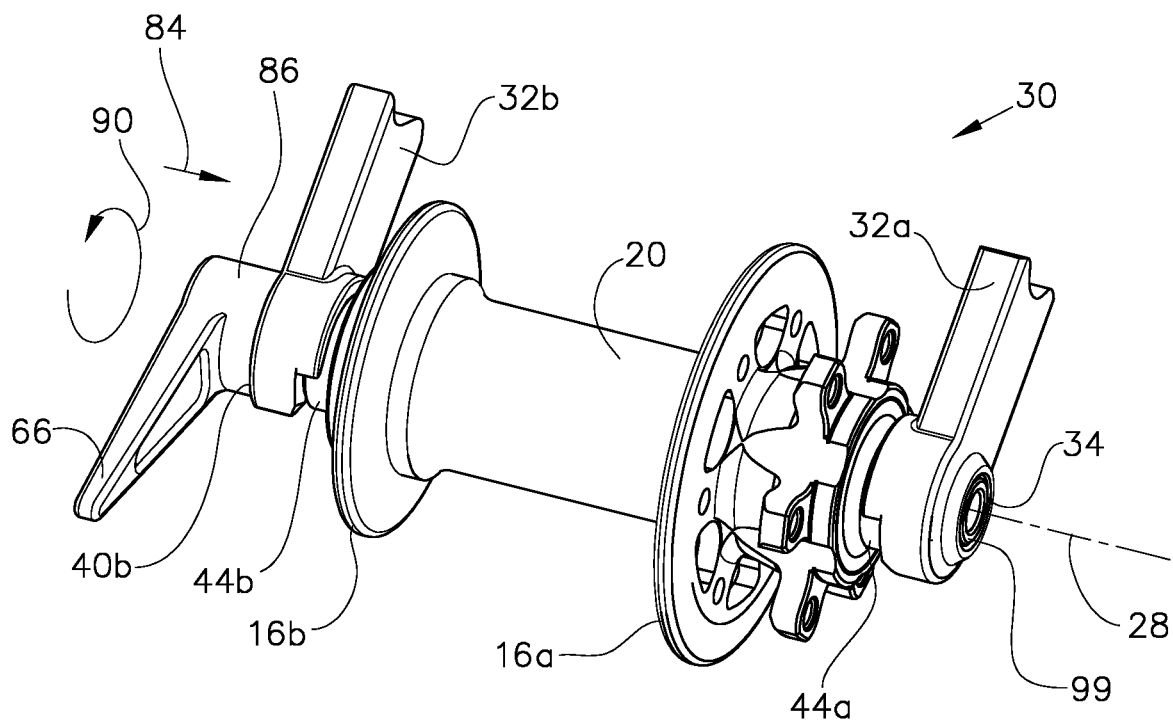
Figure 2F:
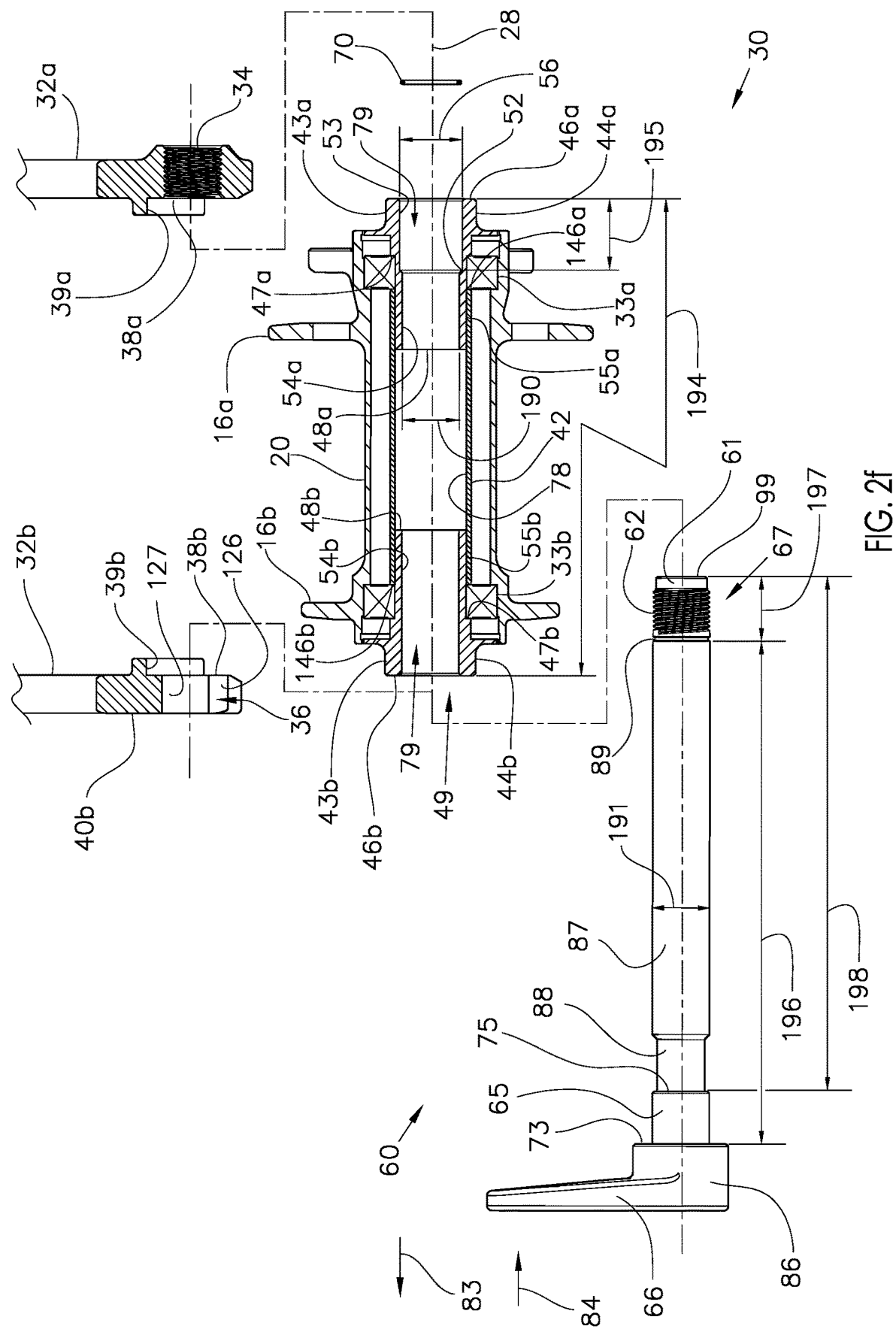
FIGS. 2f-k are cross-section views of the embodiment of FIG. 2a, taken along 124-124, showing the progressive sequence of operations involved in assembling the control shaft to the remainder of the hub assembly and then the assembly of the hub assembly with the dropouts of the frame of a bicycle.

FIGS. 2a-k describe an embodiment of the present invention with a threaded engagement between a control shaft of a hub assembly 30 and the dropout of the frame. In this embodiment, the frame is shown to include an open-slotted dropout axially opposed to this threaded engagement, for quick and easy wheel removal. FIGS. 2a and 2f are exploded views, showing the control shaft 60 prior to assembly with the sleeve assembly 49 and with the hub assembly 30 prior to its assembly with the dropouts 32a and 32b.

Figure 2G:
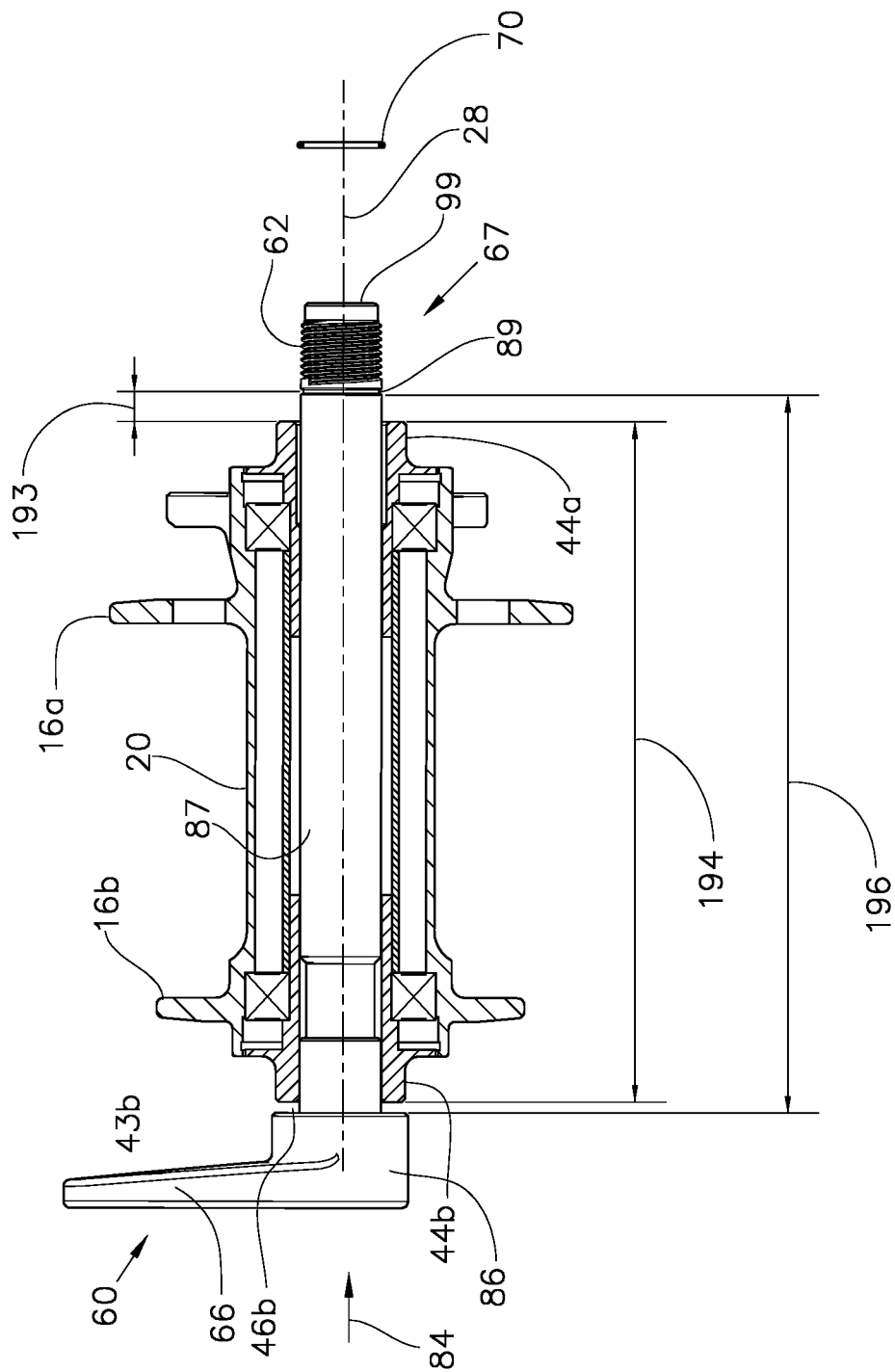
Figure 2H:
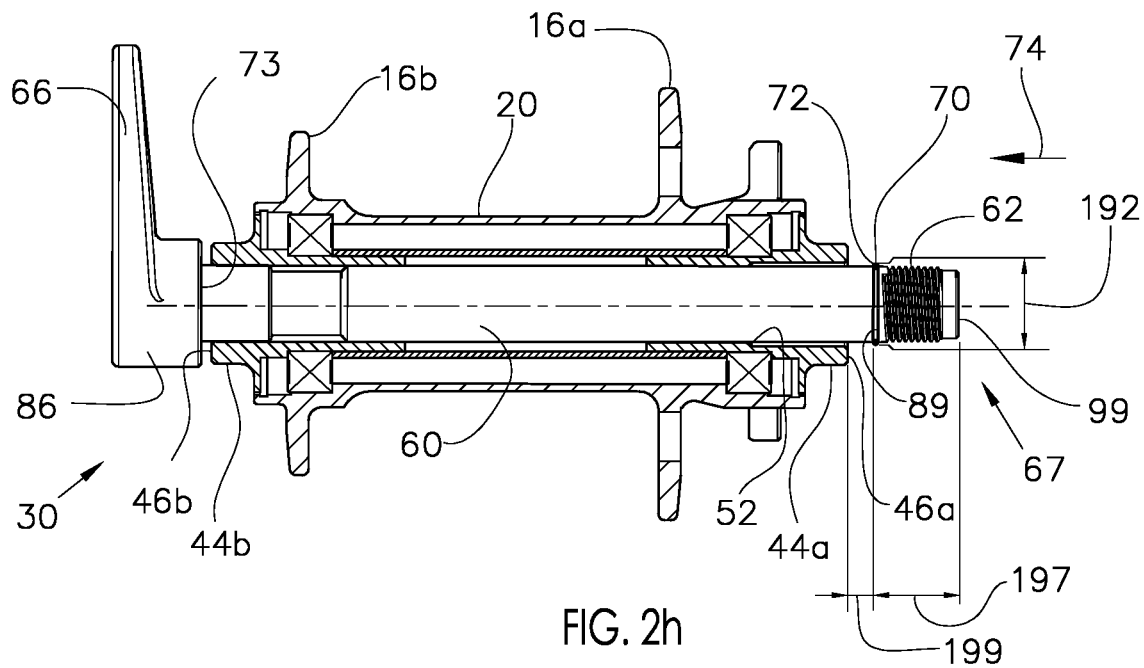
Figure 2I:
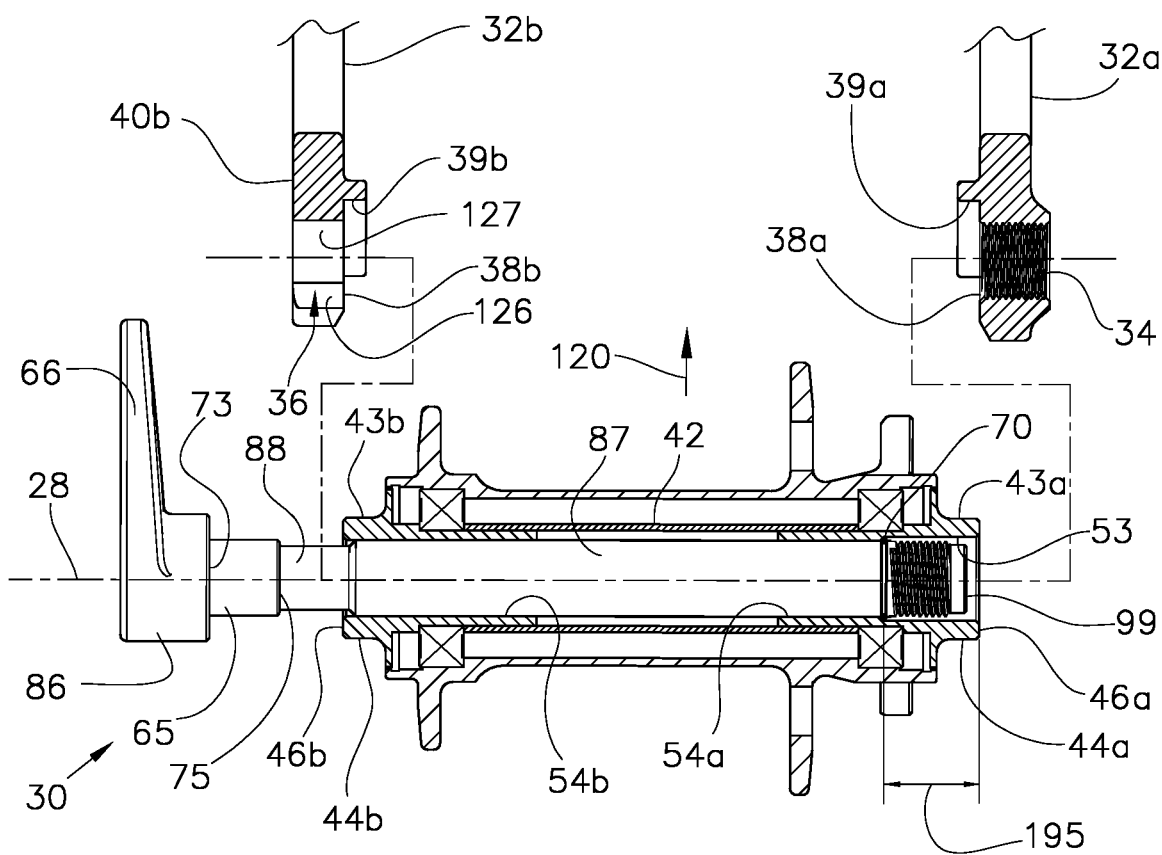
Figure 2J:
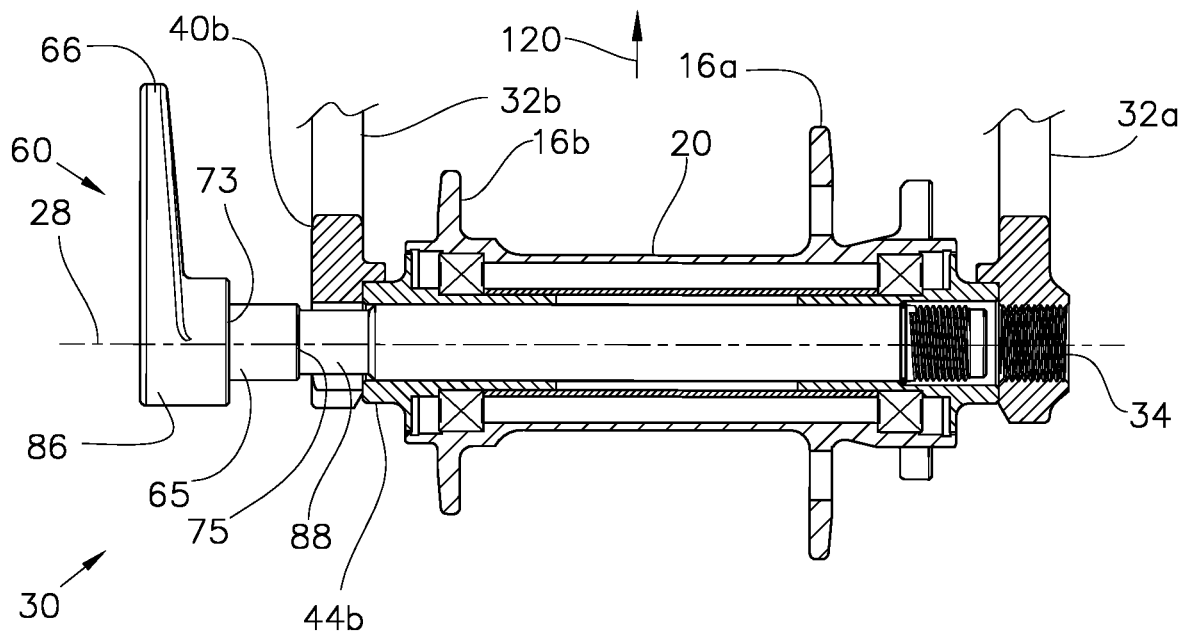
Figure 2K:
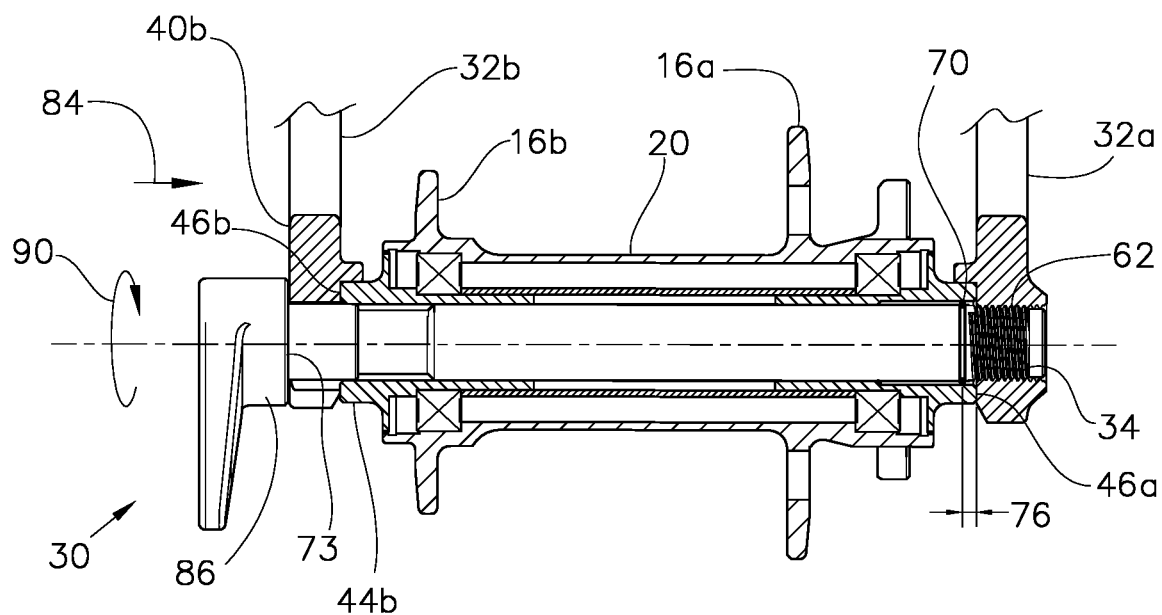
Figure 2L:
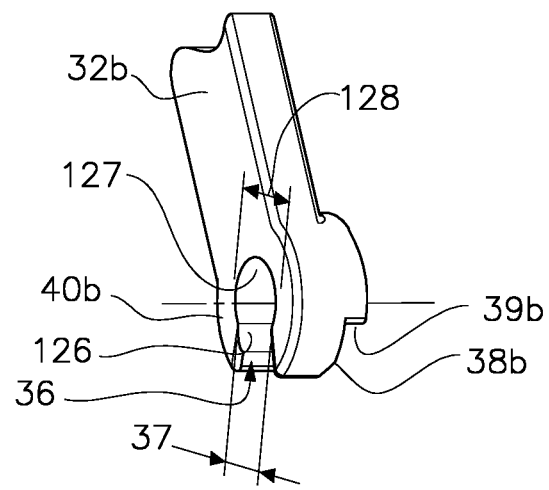

Referring to FIGS. 2a, 2f, and 2L, dropouts 32b (left dropout) and 32a (right dropout) may be considered mounting portions of the bicycle (not shown) and constitute the portion of the frame (not shown) to which the hub assembly 30 is mounted or connected. Right dropout 32a is of a generally conventional design to accept through-axle hubs and includes an internally threaded hole 34, axially inboard face 38a, and alignment surface 39a. Left dropout 32b includes an open keyhole slot 36 that is radially stepped to include a narrower necked entrance region 126 of radial width 37 and a wider enlarged circular pilot region 127 of radial width 128. This radial step occurs within the axial region between inboard face 38b and outboard face 40b. Dropout 32b also includes an axially inboard face 38b, and an axially outboard face 40b. Inboard faces 38a and 38b each include a corresponding axially inwardly projecting alignment surfaces 39a and 39b to provide radial positioning location of mating alignment surfaces 43a and 43b of axlecaps 44a and 44b respectively. Open keyhole slot 36 has a radially extending open entrance to receive the control shaft 60.

Inboard faces 38a and 38b are axially opposed and face each other, while outer face 40b is axially opposed to inboard face 38b. Width 37 of the necked entrance region 126 of open slot 36 is sized to receive the necked portion 88 of the control shaft 60 and width 128 of the pilot region 127 is sized to receive collar portion 65. The dropouts 32a and 32b shown here are more typical of the front dropouts of a bicycle frame, but the rear dropouts may be similar in design and it is understood that this design is representative of a wide range of dropout designs, either conventional or unconventional.

The hub assembly 30 includes sleeve assembly 49, control shaft 60, bearing assemblies 33a and 33b, and hub shell 20. In this case, the sleeve assembly 49 is generally stationary and intended to be rotationally fixed to the frame of the bicycle, while the hub shell 20 is rotatable about axial axis 28 and about the sleeve assembly 49 by means of bearing assemblies 33a and 33b. Bearing assemblies 33a and 33b are shown here as conventional "cartridge" type bearing assemblies, including rolling elements, an inner race, and an outer race. The hub shell 20 includes two hub flanges 16a and 16b that are adapted with spoke holes (omitted for clarity) to connect with the first ends of spokes (not shown) in the conventional manner. The sleeve assembly 49 includes sleeve 42 and axlecaps 44a and 44b and this combined assembly may be also termed the "axle sleeve".

As particularly shown in FIG. 2f, axlecaps 44a and 44b each include respective outer faces 46a and 46b, collar portions 55a and 55b with end faces 48a and 48b, cylindrical alignment surfaces 43a and 43b, shoulders 47a and 47b, and axially extending holes 54a and 54b therethrough. The diameter of holes 54a and 54 b are preferably sized to provide a radially piloting sliding fit with the shank portion 87 of the control shaft 60. Axlecap 44a also includes a counterbore 53 that has a larger diameter 56 than bore 54a, resulting in a step transition 52 between these two diameters. Bore 54a and counterbore 53 may be considered to be two axially adjacent portions of an opening through the axlecap 44a. The diameter 56 is sized to receive the snapring 70 once it has been assembled to the snapring groove 89 of the control shaft 60. The transition 52 is preferably axially located at a prescribed and predetermined axial distance 195 from the outer face 46a. Axial distance 195 is shown to be a fixed distance. The outside diameter of collar portions 55a and 55b are preferably sized to have a close alignment fit with the inside diameter of bearing assemblies 33a and 33b respectively. The sleeve 42 is a generally cylindrical tube that includes an axial bore 78 therethrough with end faces 146a and 146b. The diameter of bore 78 is preferably sized to have a close locating and sliding fit with the outside diameter of collar portions 55a and 55b such that the sleeve 42 and axlecaps 44a and 44b are radially piloted to sandwich the inner races of bearing assemblies 33a and 33b as shown in FIG. 2f. It may be preferable that axlecaps 44a and 44b are axially locked to the sleeve 42 (by means of a press fit or threaded assembly or by other means known in industry) such that any axial displacement therebetween is restricted.

Bearing assemblies 33a and 33b are first assembled to the hub shell 20 in the conventional manner, with sleeve 42 axially positioned between their respective inner races. Axlecap 44a is next assembled such that collar portion 55a extends through the inside diameter of bearing 33a and to axially overlap bore 78. Similarly, axlecap 44b is assembled such that collar portion 55b extends through the inside diameter of bearing 33b to axially overlap bore 78. Holes 54a and 54b and bore 78 combine to create a continuous through opening 79 (with open entrances adjacent outer faces 46a and 46b) to receive the control shaft 60. Bearing assemblies 33a and 33b are preferably axially sandwiched between respective shoulders 47a and 47b and end faces 48a and 48b, resulting in a solid axially abutting stack between outer faces 46a and 46b. Axlecaps 44a and 44b and sleeve 42 combine to create a sleeve assembly 49. There is preferably a prescribed axial distance 194 between outer faces 46a and 46b.

Control shaft 60 includes a shank portion 87 and an enlarged head portion 86, with a grip face 73 serving as a transition surface between the collar portion 65 and head portion 86. The shank portion 87 extends axially from the grip face 73 to the engagement end 67. Engagement end 67 of the shank portion 87 includes external threads 62, end face 99 and pilot portion 61. Shank portion 87 also includes a cylindrical collar portion 65 and a necked portion 88 that is concentric and of smaller diameter than collar portion 65 such that there is a step or transition surface 75 therebetween. The necked portion 88 may be considered as a radially relieved surface relative to the collar portion 65 and the collar portion 65 may be considered as a radially enlarged surface relative to the necked portion 88. End face 99 and transition surface 75, which correspond to first and second leading engagement edges of the control shaft 60 respectively, are axially separated by engagement distance 198, which preferably corresponds to the axial distance between the outboard face 40b and the inboard face 38a. The head portion 86 extends axially outwardly from the grip face 73 and includes lever 66 to afford additional tightening torque and leverage when the control shaft 60 is manipulated by the operator in the conventional manner. Lever 66 is provided as a representative means to facilitate the manual manipulation and rotation of the control shaft 60. A wide range of alternate means, including a hex socket (to receive a removable hex key tool) or a handle or knob may be substituted to provide similar manual rotation means.

Shank portion 87 also includes a snapring groove 89 that is radially relieved from the shank portion 87 to receive the snapring 70 in a conventional manner. The snapring groove 89 is axially located at a prescribed and predetermined axial distance 197 from the end face 99 and a prescribed and predetermined axial distance 196 from the grip face 73. Axial distance 197 is shown to be a fixed distance. Snapring 70 is a conventional split snapring, including split gap 71.

As shown in FIGS. 2a and 2f, the control shaft 60 is completely withdrawn in the retracting direction 83 to be separated from the remainder of the hub assembly 30. The hub assembly 30 is shown to be positioned to be axially aligned and radially offset from dropouts 32a and 32b.

As shown in FIG. 2g, the control shaft 60 has next been inserted into the opening 79 in the extending direction 84 by first passing the engagement end 67 through the hole 54b, then bore 78, then bore 53b, until grip face 73 approaches or abuts outer face 46b. Since there is radial clearance between the shank portion 87 and the hole 54b and bores 53a and 53b, this insertion is free and easy and without appreciable radial binding and/or axial resistance therebetween up to this point. Since the distance 196 is greater than distance 194, the snapring groove 89 is positioned axially outboard of the outer face 46a by distance 193 and thus exposed to provide access to allow the snapring 70 to be assembled thereto.

Next, as shown in FIGS. 2b and 2h, the snapring 70 is assembled to the snapring groove 89 in the conventional manner. The split gap 71 may be sized for axial assembly (in direction 74) and/or radial assembly to the snapring groove 89 in the conventional manner. As is also conventional, the snapring 70, as assembled to the snapring groove 89, creates a radially outwardly extending engagement surface that is of larger diameter 192 than the diameter 191 of the shank portion 87. Snapring 70 is also now axially retained to the shank portion 87 of the control shaft 60. Diameter 192 is larger than the diameter 190 of hole 54a and slightly smaller than diameter 56 of counterbore 53. Once the snapring 70 is assembled and nested in snapring groove 89, as shown in FIGS. 2b and 2h, it is axially fixed and retained to the control shaft 60. Snapring 70 provides an engagement surface 72 that is radially raised relative to shank portion 87 and is shown to be axially outboard of outer face 46a by distance 199. Since snapring 70 is commonly made of a relatively rigid material, it may be considered that, once the snapring 70 is installed, the engagement surface 72 is generally radially fixed relative to the snapring groove 89 and to the shank portion 87. Since snapring 70 is also discreet from the control shaft 60 and may be selectively installed and removed from its groove 89 of the control shaft 60, it is understood that engagement surface 72 may be considered to be a removable engagement surface.

Next, as shown in FIGS. 2c and 2i, the control shaft 60 has been axially retracted and shuttled in the retracting direction 83 until snapring 70 axially abuts the step transition 52 and the control shaft 60 is in the axially retracted position relative to the sleeve assembly 49. The step transition 52 serves as a radially inwardly extending engagement surface of the sleeve assembly 49. Step transition 52 and engagement surface 72 radially overlie each other such that the axial abutment between the engagement surface 72 of snapring 70 and the step transition 52 serves as an axial limit stop to control the axial travel of the control shaft 60 with respect to the sleeve assembly 49 (and the remainder of the hub assembly 30). Since engagement surface 72 is generally radially fixed to the shank portion, this limit stop may not be easily overcome and defeated under normal circumstances. Since distances 197, 196, and 195 are predetermined and controlled, this axial abutment corresponds to a retracted position of the control shaft 60 where the end face 99 is preferably axially flush or axially inboard of outer face 46a. Correspondingly, this retracted position also corresponds to a controlled axial distance 194 between transition surface 75 and outer face 46b. In this retracted position, the end face 99 is shown to be slightly axially inboard and recessed from end face 46a and the necked portion 88 is aligned to be extending axially outboard of end face 46b. The hub assembly 30 is shown to be axially aligned and radially offset from dropouts 32a and 32b in preparation for assembly thereto. It is noted that, in this retracted position, the snapring groove 89 is axially inboard from outer face 46a and is obscured by the counterbore 53 such that the snapring 70 may not be manipulated or uninstalled from the snapring groove 89. Further, the diameter 56 of counterbore 53 may be sized to have a close clearance fit with the outside diameter 192 of snapring 70 to limit radial expansion of the snapring 70 and prevent it from expanding and losing its axial engagement with snapring groove 89.

Next, as shown in FIGS. 2d and 2j, the hub assembly 30 is moved in the generally radial direction 120 relative to the dropouts 32a and 32b, with the control shaft 60 still in the retracted position, such that alignment surfaces 43a and 43b are each radially abutting and nested with respective alignment surfaces 39a and 39b to provide radial alignment between the hub assembly 30 and dropouts 32a and 32b. These nested engagements serve to provide a radial positioning depth stop of the hub assembly 30 relative to the dropouts 32a and 32b in the conventional manner. Transition surface 75 is axially coincident or preferably slightly axially outboard of outboard face 40b. Necked portion 88 has passed through necked entrance region 126 such that necked portion 88 is now radially centered within pilot region 127. Outer face 46a is also axially adjoining end face 38a while outer face 46b is also axially adjoining inboard face 38b to provide axial alignment between the hub assembly 30 and dropouts 32a and 32b. The external threads 62 are now radially aligned with internal threaded hole 34 and collar portion 65 is radially aligned with pilot region 127.

Next, as shown in FIGS. 2e and 2k, the operator has next manually pressed the head portion 86 in the extending direction 84 to linearly displace and shuttle the control shaft 60 in direction 84 (the "extending direction") relative to sleeve assembly 49 and to the point that the external threads 62 may now "catch" and be threadably engaged with internally threaded hole 34. The control shaft 60 is then also simultaneously manually rotated (by means of lever 66) in direction 90 to threadably engage external threads 62 with internal threaded hole 34 to threadably advance the control shaft 60 further in direction 84 until the grip face 73 axially presses and clamps against outboard face 40b.

Outer face 46a is now axially pressed against end face 38a and outer face 46b is also axially pressed against inboard face 38b and the control shaft 60 is in the engaged position. Further threadable tightening of the head portion 86 in direction 90 serves to axially draw outer face 46b toward grip face 73, thereby firmly clamping dropout 32b between grip face 73 and outer face 46b. The sleeve assembly 49 is also axially clamped between inboard faces 38a and 38b. The engagement end 67 is now fully axially overlapping the internal threaded opening 34 and the collar portion 65 is now fully axially overlapping the pilot region 127 to more positively radially retain the hub assembly 30 to the dropouts 32a and 32b. The control shaft 60 is now in the "extended position" relative to the sleeve assembly 49 and dropouts 32a and 32b. With the control shaft 60 fully threadably cinched and tightened as described above, it is now in the fully extended position relative to the sleeve assembly 49 and the hub assembly 30 is firmly clamped, installed, and assembled to the dropouts 32a ad 32b. The snapring 70 is axially inboard of inboard face 38a by distance 76.

The procedure for uninstallation and removal of the hub assembly 30 from the dropouts 32a and 32b is basically the reverse of the assembly and installation sequence just described. For this removal, the control shaft 60 is first manually unthreaded from the internally threaded hole 34, in a direction opposite to direction 90, via head portion 86, until the external threads 62 are disengaged from the internally threaded hole 34, axially displacing the control shaft 60 in the retracting direction 83.

Once the threaded engagement between the external threads 62 and internal threaded hole 34 is fully unthreaded, the head portion 86 may then be freely linearly retracted and axially withdrawn in the retracting direction 83 until the snapring 70 axially abuts the thread step transition 52 and the control shaft 60 is in the retracted position as shown in FIGS. 2c and 2j. There is free and easy linear advancement of the control shaft 60 in between the extended and retracted positions because there is little or no interference or radial impingement therebetween such that very little retracting force is required by the operator.

Once the control shaft 60 has been displaced in the retracting direction 83 to the retracted position, the axially abutting and radially overlying engagement between snapring 70 and step transition 52 provides a restraint against further advancement in direction 83, which also serves to provide a tactile feedback to the operator indicating that the control shaft 60 is again in the axially retracted position as shown in FIGS. 2*d* and 2*j*. The retracted position also corresponds to the transition between the free axial displacement of the control shaft 60 and the restrained and limited axial displacement of the control shaft 60 in direction 83. This restrained and limited axial displacement also serves to retain the control shaft 60 with the sleeve assembly 49 to restrain and resist the inadvertent separation between the two.

This tactile feedback lets the operator know that the retracted position has been achieved such that the end face 99 is recessed from outer face 46*a* and the necked portion 88 is axially aligned with the necked entrance region 126 such that engagement end 67 is no longer axially overlapping the internal threaded hole 34 and collar portion 65 is no longer axially overlapping the pilot region 127. This axially abutting engagement interface between snapring 70 and step transition 52 serves to axially restrain and limit the displacement of the control shaft 60 in the retracting direction 83 and provides a radially overlapping overlie engagement with the sleeve assembly 49 to restrain axial displacement therebetween.

The hub assembly 30 may now be radially disassembled and removed from the dropouts 32*a* and 32*b* in a direction opposite to direction 120 as shown in FIGS. 2*c* and 2*i*. It is noted that the control shaft 60 need not be completely withdrawn in the retracting direction 83 (as shown in FIG. 2*a*, for example) in order to remove the hub assembly 30 and control shaft 60 from the dropouts 32*a* and 32*b*. The hub assembly 30 may later be assembled to the dropouts 32*a* and 32*b* in the procedure previously described in FIGS. 2*j-k*. Thus the tactile feedback provided by the axially abutting engagement serves as an aid to the operator in detecting the retracted position during both the disassembly and assembly procedures with the dropouts 32*a* and 32*b* as described hereinabove.

In the case where the operator would like to completely withdraw and remove the control shaft 60 from the sleeve assembly 49, the operator may next axially shuttle the control shaft 60 in the extending direction 84 to the to the hyper-extended position as shown in FIGS. 2*h* and 2*b*. The snapring 70 is now exposed and axially outboard of the sleeve assembly 49 such that it may be accessed to be manipulated out of snapring groove 89 and removed from the control shaft 60. The control shaft 60 may next be displaced in the retracting direction 83, past the retracted position, and fully withdrawn from the sleeve assembly 49 and the remainder of the hub assembly 30 as shown in FIGS. 2*a* and 2*f*.

Figure 3A:
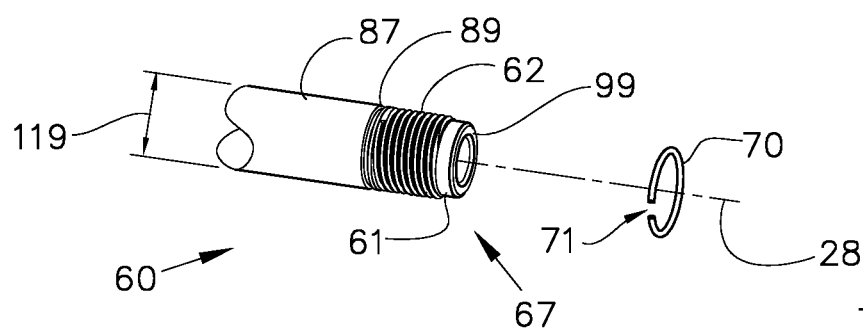
FIG. 3a is a perspective detail view of the embodiment of FIG. 2a, and corresponding to the assembly sequence of FIG. 2g, and showing the engagement end of the control shaft, with the snapring in preparation for assembly with the snapring groove.
Figure 3B:
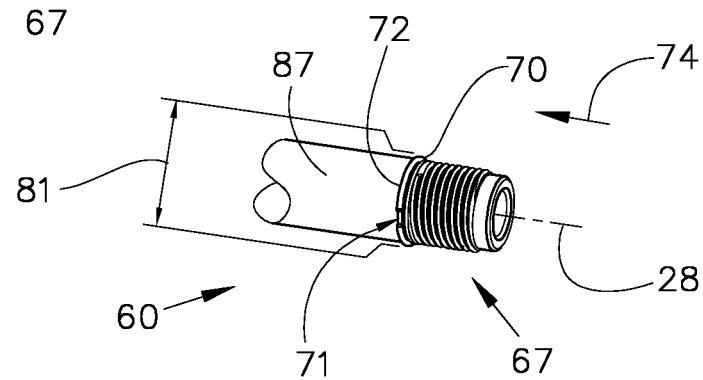
FIG. 3b is a perspective detail view of the embodiment of FIG. 3a, and corresponding to the assembly sequence of FIG. 2h, and showing the engagement end of the control shaft, with the snapring assembled to the snapring groove.

FIGS. 3*a-b* detail the control shaft 60 and snapring 70 of FIGS. 2*a-k*. FIG. 3*a* shows the snapring 70 prior to installation in its snapring groove 89 of the control shaft 60. FIG. 3*b* shows the snapring 70 as installed in the snapring groove 89 to reveal and create engagement surface 72. It is this engagement surface 72 that serves to provide the aforementioned overlie engagement between the snapring 70 and the step transition 52. Snapring 70 may be considered as a circumferentially discontinuous element (due to split gap 71) that is assembled and axially engaged to a continuous circumferential recess (i.e. snapring groove 89). To install the snapring 70 into the snapring groove 89, the snapring 70 is first radially expanded (enlarging the split gap 71) such that it may be axially installed in the conventional manner onto the control shaft 60 in direction 74 and then allowed to elastically radially contract to be nested in its snapring groove 89 to be axially engaged with the control shaft 60.

The installed snapring 70 has an outside diameter 81 that is radially raised and larger than the diameter 119 of the adjacent shank portion 87. Alternatively, the split gap 71 may be sized such that the snapring may be installed in the radial direction to nest within the snapring groove 89, as is known in industry.

Figure 3C:
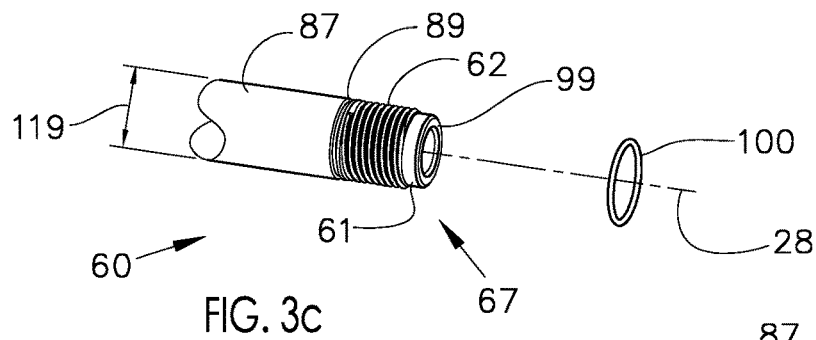
FIG. 3c is a perspective detail view of a second embodiment of the present invention, and corresponding to the assembly sequence of FIG. 2g, and showing the engagement end of the control shaft, with an o-ring substituted for the snapring of FIGS. 2a-k. The o-ring is shown in preparation for assembly with the groove of the control shaft.
Figure 3D:
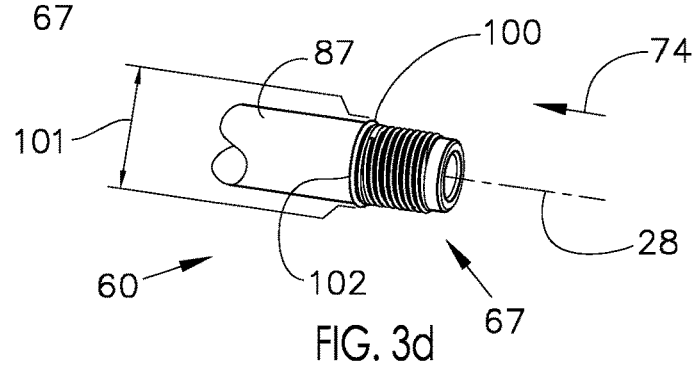
FIG. 3d is a perspective detail view of the embodiment of FIG. 3c, and corresponding to the assembly sequence of FIG. 2h, showing the engagement end of the control shaft, with the o-ring assembled to the mating groove of the control shaft.

FIGS. 3*c-d* show an elastic o-ring 100 to be substituted for the snapring 70 of FIGS. 3*a-b*. FIG. 3*c* shows the o-ring 100 prior to installation in the snapring groove 89 of the control shaft 60. The o-ring 100 is a circumferentially continuous ring made of an elastic material, including materials such as such as rubber or other elastomer. It is also understood that o-ring 100 may be made of any alternate material having sufficient elasticity for assembly to the snapring groove 89 as described herein. FIG. 3*d* shows the o-ring 100 as installed in the snapring groove 89 in the conventional manner. To install the o-ring 100 into the snapring groove 89, the o-ring 100 is first radially expanded and stretched such that it may be axially installed in the conventional manner onto the control shaft 60 in direction 74 and then allowed to elastically radially contract to be nested in its snapring groove 89 and to be axially retained and engaged with the control shaft 60. The installed o-ring 100 has an outside diameter 101 that is radially raised and larger than the diameter 119 of the adjacent shank portion 87. This o-ring 100 may serve to provide an engagement surface 102 of the control shaft 110 that may be installed and/or removed from the control shaft 110. The engagement surface 102 may be utilized to axially retain the control shaft 60 to the sleeve assembly 49 in a manner similar to the snapring 70 of FIGS. 3*a-b*.

Figure 3E:
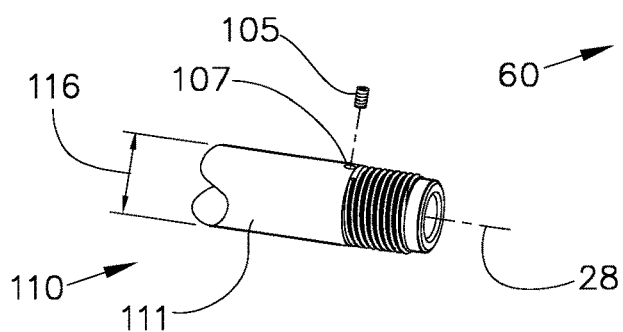
FIG. 3e is a perspective detail view of a third embodiment of the present invention, and corresponding to the assembly sequence of FIG. 2g, and showing the engagement end of the control shaft having an internally threaded cross-hole, with a set screw in preparation for assembly with the cross-hole of the control shaft.
Figure 3F:
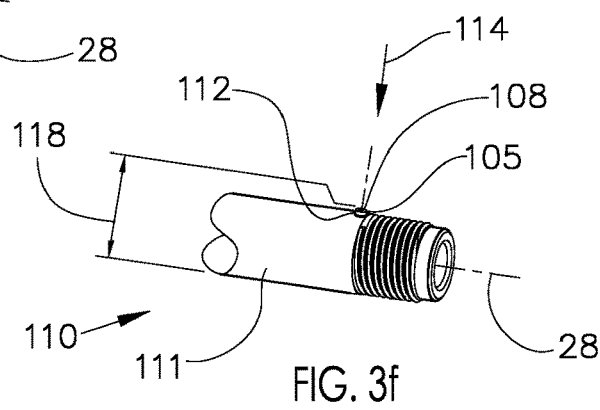
FIG. 3f is a perspective detail view of the embodiment of FIG. 3e, and corresponding to the assembly sequence of FIG. 2g, showing the engagement end of the control shaft, with the set screw threadably assembled to the cross-hole of the control shaft.

FIGS. 3*e-f* show a set screw 105 that may be installed in a radial hole of the control shaft 110 to provide an engagement surface 112 of the control shaft 110. Control shaft 110 includes a threaded hole 107 instead of a snapring groove, but is otherwise identical to control shaft 60 of FIGS. 2*a-k*. Threaded hole 107 may be considered to be a radially extending recess of the control shaft 110 that is also considered to be circumferentially discontinuous. FIG. 3*e* shows the set screw 105 prior to installation in the threaded hole 107. FIG. 3*f* shows the set screw 105 as threadably assembled to threaded hole 107 in direction 114 such that a projecting portion 108 of the set screw 105 is radially outward and proud of the shank portion 111 of the control shaft 110 to reveal a radially raised engagement surface 112. The engagement between set screw 105 and threaded hole 107 is substituted for the engagement between the snapring 70 and snapring groove 89 of FIGS. 3*a-b*. This threadable assembly may be achieved when the control shaft is in the hyper-extended position where threaded hole 107 is exposed similar to that described in FIGS. 2*b* and 2*g*. The radial dimension 118 to the projecting portion 108 is greater than diameter 116. This projecting portion 108 may serve to provide an engagement surface 112 that is axially engaged to the control shaft 110 and that may be installed and/or removed from the control shaft 110. The engagement surface 112 may be utilized to axially retain the control shaft 110 to the sleeve assembly 49 in a manner similar to the snapring 70 of FIGS. 3*a-b* or the o-ring 100 of FIGS. 3*c-d*. Projecting portion 108 may also be considered to be a circumferentially discontinuous engagement element since it does not continuously circumferentially surround the control shaft like the o-ring 100 of FIGS. 3*c-d*.

Figure 3G:
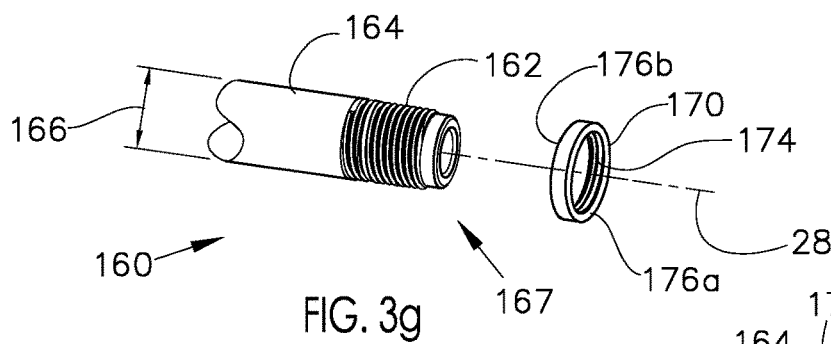
FIG. 3g is a perspective detail view of a fourth embodiment of the present invention, and corresponding to the assembly sequence of FIG. 2g, and showing the engagement end of the control shaft, with an internally threaded collar substituted for the snapring of FIGS. 2a-k. The collar is shown in preparation for assembly with the groove of the control shaft.
Figure 3H:
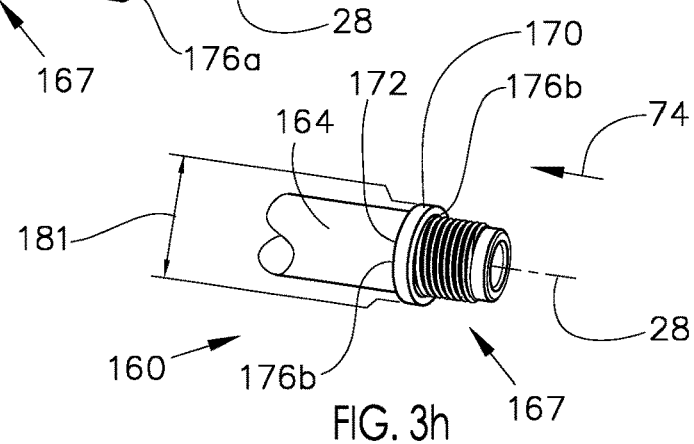
FIG. 3h is a perspective detail view of the embodiment of FIG. 3c, and corresponding to the assembly sequence of FIG. 2h, showing the engagement end of the control shaft, with the collar threadably assembled to the mating groove of the control shaft.

FIGS. 3*g-h* show an internally threaded collar 170 to be substituted for the snapring 70 of FIGS. 3*a-b*. FIG. 3*g* shows the collar 170 prior to threadable assembly with the external threads 162 of the control shaft 160. Control shaft 160 includes a shank portion 164 of diameter 166 and an engagement end with external threads 162. The collar 170 includes an internally threaded hole 174 and end faces 176a and 176b. FIG. 3h shows the collar 170 as threadably installed to the engagement end 167, with external threads 162 threadably mated to internally threaded hole 174. To install the collar 170 onto the engagement end 167, internally threaded hole 174 is threadably engaged with external threads 162 in direction 74 to be axially engaged with the control shaft 160. The installed collar 170 has an outside diameter 181 that is radially raised and larger than the diameter 166 of the adjacent shank portion 187. The end face 176b may then serve to provide an engagement surface 172 that is axially engaged with the control shaft 160 and that may be installed and/or removed from the control shaft 160. The engagement surface 172 may be utilized to axially retain the control shaft 160 to the sleeve assembly 49 in a manner similar to the snapring 70 of FIGS. 3a-b.

The engagements between snapring 70 and snapring groove 89 and between o-ring 100 and snapring groove 89 and between set screw 105 and threaded hole 107 and between collar 170 and external threads 162 are all removable engagements such that their respective engagement surfaces 72, 102, 112, and 172 may be selectively installed and removed. When the control shaft is in the hyper-extended position, as described hereinabove, access is provided to facilitate this installation and removal.

It is noted that FIGS. 2a-k shows the snapring 70 as assembled (to groove 89) and axially positioned on the control shaft 60 such that it is axially outboard of the outer face 46a. This permits the snapring 70 to be fully exposed with the control shaft in the hyper-extended position such that the snapring 70 may be easily manipulated to be installed and removed to/from the groove 89. The control shaft is retained to the remainder of the hub assembly 30 on installation of the snapring 70 and may be withdrawn and disassembled from the hub assembly 30 on removal of the snapring.

Figure 4A:
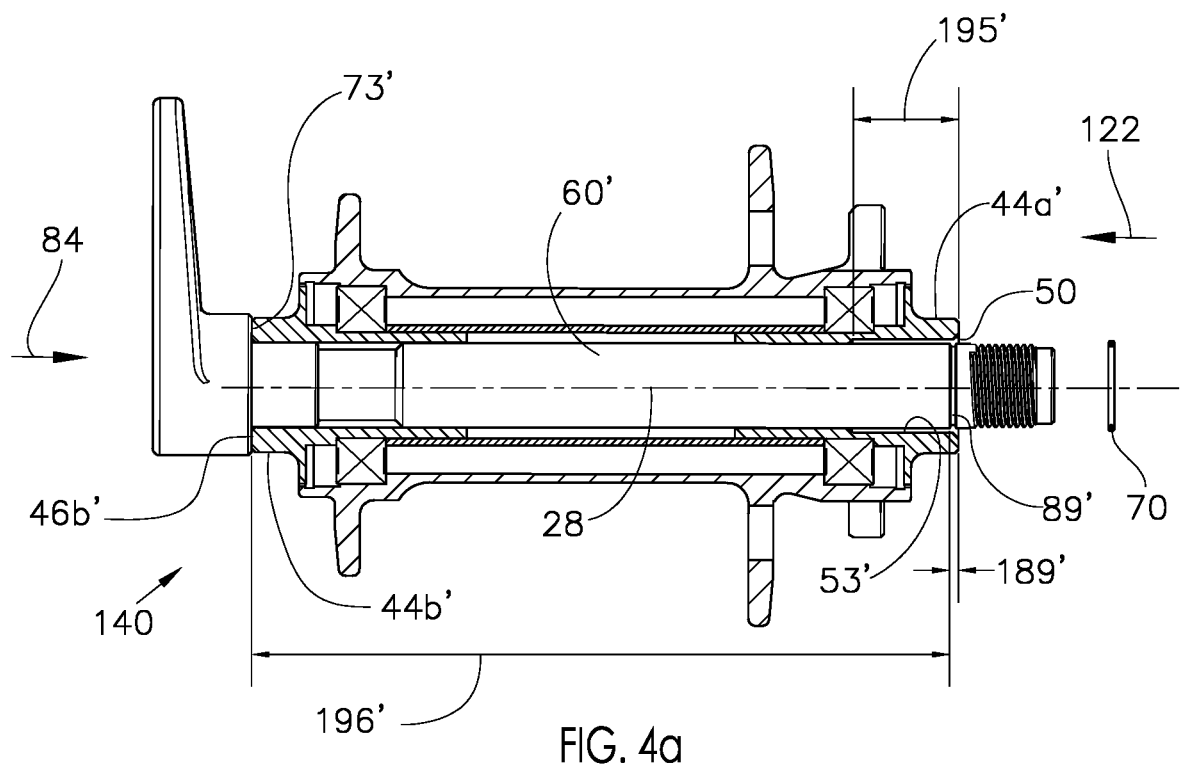
FIG. 4a is a radial cross-section view of a fifth embodiment the present invention, corresponding to the assembly sequence of FIG. 2g, showing the control shaft inserted within the axle sleeve to a hyper-extended position to permit access to the snapring groove, and with the snapring in preparation for assembly with the snapring groove.
Figure 4B:
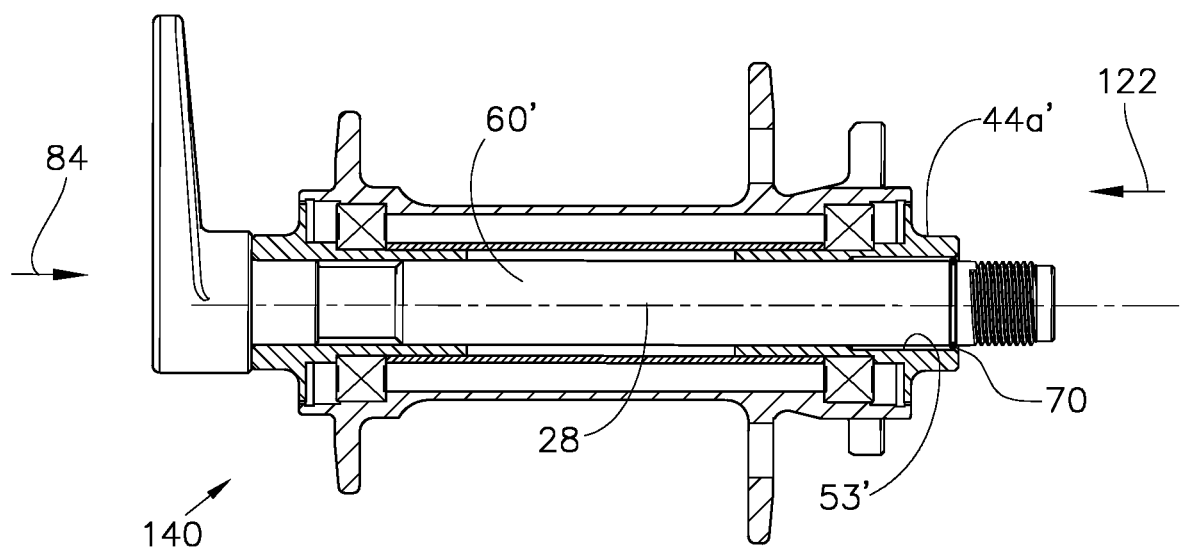
FIG. 4b is a radial cross-section view of the embodiment of FIG. 4a, showing the snapring next assembled to the snapring groove.

It is understood that the snapring groove 89 may alternatively be axially positioned on the control shaft 60 such that it is axially coincident or even axially inboard of the outer face 46a. Such an alternate arrangement is described in the hub assembly 140 of FIGS. 4a-b. In FIGS. 4a-b, the hub shell 20, bearings 33a and 33b, snapring 70, axlecap 44b, and sleeve 42 are identical to those described in FIGS. 2a-k. The axlecap 44a' is identical to axlecap 44a with the exception that counterbore 53' includes a chamfer 50 to provide clearance for the snapring 70 to be assembled to the snapring groove 89' while the control shaft 60' is in the fully hyper-extended position with grip face 73'. Axlecap 44b' is identical to axlecap 44b and includes outer face 46b'. Also, distance 195' is somewhat longer than distance 195 to compensate for the shorter distance 196' to maintain the proper positioning of the control shaft 60' relative to the sleeve assembly 49 when in the retracted position as described in FIGS. 2c and 2i.

The Control shaft 60' is identical to control shaft 60 of FIGS. 2a-k with the exception that distance 196' is somewhat shorter than distance 196 such that, when the control shaft 60' is in the fully hyper-extended position (with grip face 73' axially abutting the outer face 46b), the groove 89' is axially inboard of outer face 46a' by distance 189 as shown in FIG. 4a. FIG. 4b shows the snapring 70 as assembled to groove 89' in direction 122. It is noted that there is sufficient radial clearance provided by the chamfer 50 and the counterbore 53 to allow for this assembly. It is preferable that this radial clearance is also sufficient to insert a probe or tool (not shown) to be utilized to expand the snapring 70 out of its groove 89 to be removed in a direction axially opposed to direction 122.

The embodiments of FIGS. 2a-k and 5a-b show the removable engagement surface 72 as being removably assembled to the control shaft 60 (and 60'), whereby the engagement surface 72 has a radially (outwardly) overlapping engagement with the sleeve assembly 49 to axially retain the control shaft 60 thereto. Alternatively, the sleeve assembly may include a removable engagement surface, whereby this engagement surface has a radially (inwardly) overlapping engagement with the control shaft to axially retain the control shaft thereto. Such an alternate embodiment is described in FIGS. 5a-b where an internal snapring 130 is removably engaged to the axlecap 144b. Axlecap 144b is identical to axlecap 44b with the exception that bore 154 is straight and does not include a counterbore, but instead includes an internal snapring groove 148. Control shaft 135 is identical to control shaft 60 with the exception that, instead of snapring groove 89, control shaft 135 includes a radially relieved portion 137 axially bounded by shoulders 139a and 139b.

Figure 5A:
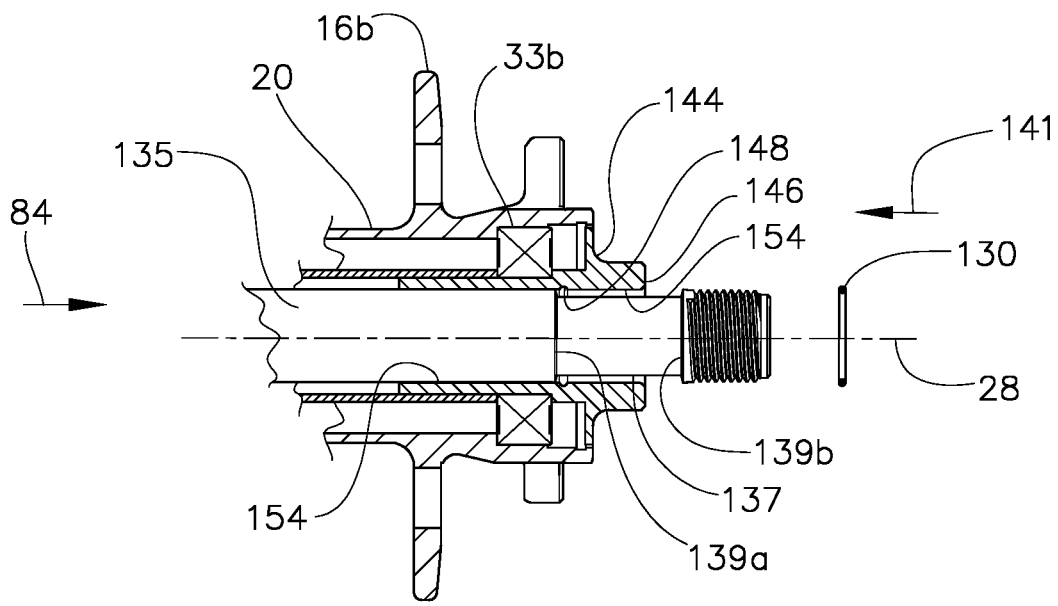
FIG. 5a is a radial cross-section view of a sixth embodiment the present invention, corresponding to the assembly sequence of FIG. 2g, showing the control shaft inserted within the axle sleeve to a hyper-extended position to permit access to a snapring groove of the axle sleeve assembly, and with the snapring shown prior to assembly with the snapring groove.
Figure 5B:
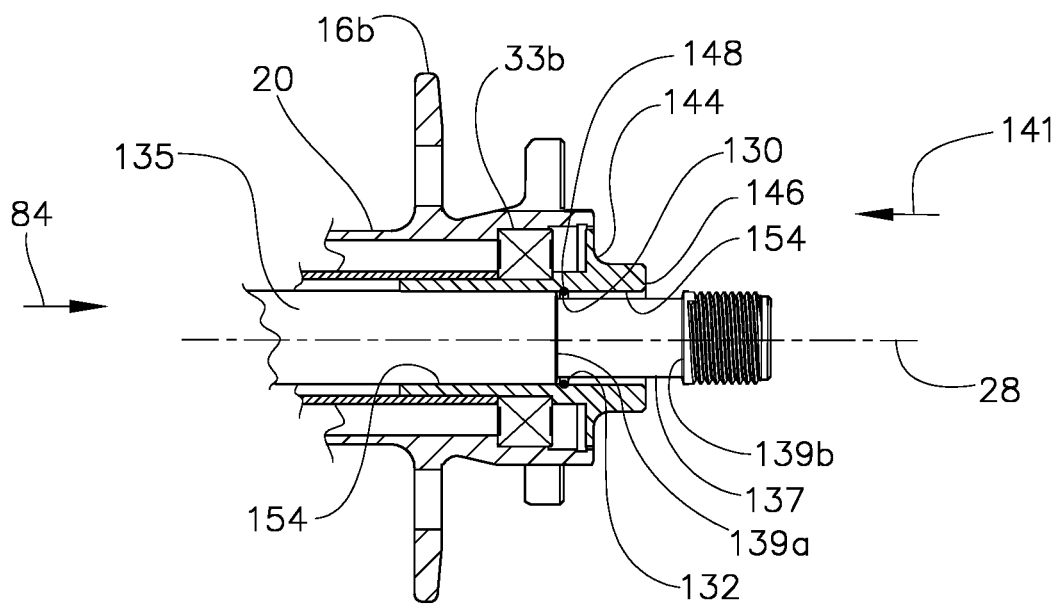
FIG. 5b is a radial cross-section view of the embodiment of FIG. 5a, showing the snapring next assembled over the engagement end of the control shaft and installed in the snapring groove of the sleeve assembly.

As shown in FIG. 5a, which corresponds to the hyper-extended position of the control shaft 135 (as described in FIGS. 4a-b), shows the shoulder 139b as axially outboard of end face 146 of the axlecap 144. This allows the snapring 130 to be installed and removed from its groove 148 by manipulating it in direction 141 through the radial gap between the bore 154 and relieved portion 137. As shown in FIG. 5b, the installed snapring 130 provides an engagement surface 132 that extends radially inwardly from its adjacent bore 154. FIG. 5b shows the snapring 130 installed in its groove 148 to retain the control shaft 135 to the axlecap 144 and its corresponding sleeve assembly (not labeled). Snapring 130 is also axially retained to groove 148 in the conventional manner. It is preferable that this radial gap is also sufficient to insert a probe or tool (not shown) to be utilized to expand the snapring 130 out of its groove 148 to be removed in a direction axially opposed to direction 141. The engagement surface 132 of the snapring 130 radially overlaps the shoulder 139b.

Figure 5C:
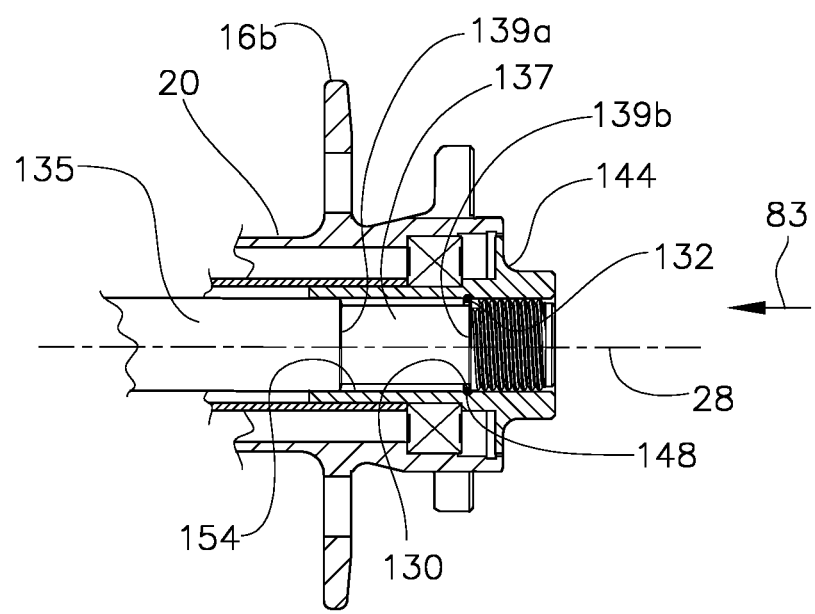
FIG. 5c is a radial cross-section view of the embodiment of FIG. 5a, showing the control shaft next axially shuttled in the retracting direction to the retracted position.

FIG. 5c shows the control shaft 135 as next axially displaced in direction 83 until shoulder 139b axially abuts the engagement surface 132 of snapring 130 in a radial overlie engagement interface. The control shaft 135 is now in the retracted position (as described in FIGS. 2a-k). It is noted that shoulder 139b constitutes a radially outwardly projecting engagement surface of the control shaft 135 (relative to the relieved portion 137). This radially overlapping overlie engagement between engagement surface 132 and shoulder 139b serves to retain the control shaft 135 to the axlecap 144 and sleeve assembly and to prevent further displacement of the control shaft 135 in the retracting direction 83. If the snapring 130 is removed from the snapring groove 148, preferably with the control shaft 135 in the hyper-extended position, the control shaft 135 may then be fully withdrawn and separated from the remainder of the hub assembly 30.

While my above description contains many specificities, these should not be construed as limitations on the scope of the invention, but rather as exemplifications of embodiments thereof. For example:

FIGS. 2b, 2g, and 2h show control shaft in the hyperextended position such that the snapring 70 is exposed and axially outboard of the end face 46a such that snapring groove 89 and snapring 70 are no longer axially overlapping the opening 79. This provides easy access to the snapring 70 so that it may be manipulated to be installed and/or removed such that the control shaft 60 may be extracted from the remainder of the hub assembly 30. Alternatively, the control shaft 60 may be configured such that the snapring is not exposed in the hyper-extended position, but is instead axially coincident or axially inboard of the end face 46a, as described in FIGS. 4a-b and 5a-c. However, the opening 79 may be configured such that the snapring 70 may be accessed and manipulated for installation and/or removal even though it is concealed by the sleeve assembly 49. For example, the opening 79 may be enlarged in a region adjacent the end face 46a to provide clearance for this access.

In FIGS. 2a-k, the width of the snapring groove 89 is matched to the mating snapring 70 such that there is little or no axial freeplay between the two once the snapring 70 is installed in the snapring groove 89. Alternatively, the snapring groove may be designed to be axially wider than the snapring. This would allow for some appreciable axial movement of the snapring 70 when it is seated in its snapring groove. This would permit a certain amount of lost axial motion therebetween, which may possibly be beneficial in controlling the axial motion of the control shaft relative to the sleeve assembly 49.

The snapring groove 89 is are shown to be axially fixed and integral with the control shaft. However, it is envisioned that the groove may be in an element separate from the control shaft such that the snapring, with its corresponding engagement surface, is axially displaceable relative to the control shaft.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A vehicle wheel axle assembly, comprising:
   an axle sleeve that is rotationally stationary about an axial axis and that includes: a first end face; a second end face axially spaced from said first end face; an axially extending opening between said first end face and said second end face having a first entrance adjacent said first end face and a second entrance adjacent said second end face;
   a control shaft including: an engagement end and a control end axially opposed said engagement end;
   wherein said control shaft extends within said opening to be axially overlapping said axle sleeve with said engagement end proximal said first end face and distal said second end face;
   wherein said control shaft is axially displaceable relative to said axle sleeve in an extending direction toward said first end face and an retracting direction axially opposed to said extending direction and toward said second end face;
   wherein said opening includes a radially inwardly projecting first engagement surface and said control shaft includes a radially outwardly projecting second engagement surface;
   wherein said control shaft is axially retained to said axle sleeve by an overlie engagement at an engagement interface between said first engagement surface and said second engagement surface to limit the axial displacement of said control shaft in said retracting direction at an axially engaged position relative to said axle sleeve;
   wherein at least one of:
   (i) said first engagement surface is in an engagement element discreet from and axially retained to said axle sleeve and wherein said engagement element may be manipulated adjacent said first entrance to be installed to said axle sleeve and/or removed from said axle sleeve such that said first engagement surface is a removable engagement surface; and
   (ii) said second engagement surface is in an engagement element discreet from and axially retained to said control shaft and wherein said engagement element may be manipulated adjacent said first entrance to be installed to said control shaft and/or removed from said control shaft such that said second engagement surface is a removable engagement surface.

2. The vehicle wheel axle assembly according to claim 1, including a frame element, including first frame member and a second frame member to interface with said axle assembly, including an axial space between said first frame member and said second frame member;
   wherein said control shaft may be axially displaced relative to said axle sleeve in said extending direction to an extended position such that said axle assembly is assembled to said frame and may be axially displaced in said retracting direction to a retracted position such that said axle assembly may be disassembled from said frame;
   wherein, with said axle assembly disassembled from said frame, said control shaft may be axially displaced in said extending direction from said extended position to a hyper-extended position to at least one of: (i) facilitate said manipulation of said engagement element for said installation of said engagement element to said control shaft and/or removal of said engagement element from said control shaft; and (ii) facilitate said manipulation of said engagement element for said installation of said engagement element to said axle sleeve and/or removal of said engagement element from said axle sleeve.

3. The vehicle wheel axle assembly according to claim 2, where said engagement element is axially outboard of said first end face in said hyper-extended position.

4. The vehicle wheel axle assembly according to claim 2, where said second engagement surface is axially outboard of said first end face in said hyper-extended position.

5. The vehicle wheel axle assembly according to claim 2, wherein said control shaft includes an axially inwardly facing grip face adjacent said control end, wherein said grip face axially abuts said second end face in said hyper-extended position.

6. The vehicle wheel axle assembly according to claim 2, wherein at least one of said first frame member and said second frame member includes an open slot, with an open entrance portion, to radially receive said control shaft.

7. The vehicle wheel axle assembly according to claim 1, wherein, with said engagement element removed from the control shaft and/or axle sleeve to which it is retained, said control shaft may be displaced in said retracting direction to a withdrawn position wherein said control shaft is withdrawn from said axle sleeve.

8. The vehicle wheel axle assembly according to claim 1, wherein said axially engaged position is a predetermined axial position that corresponds to said retracted position.

9. The vehicle wheel axle assembly according to claim 8, wherein said engagement end is axially flush or axially inboard relative to said first end face in said retracted position.

10. The vehicle wheel axle assembly according to claim 1, wherein said engagement element is a snapring.

11. The vehicle wheel axle assembly according to claim 1, wherein said engagement element is circumferentially continuous ring.

12. The vehicle wheel axle assembly according to claim 1, wherein said engagement element is a circumferentially discontinuous projection.

13. The vehicle wheel axle assembly according to claim 1, wherein said engagement element is an elastic element such that it may be elastically deformed during its installation to the axle sleeve or sleeve or control shaft to which it is retained and/or during its removals from the axle sleeve or control shaft to which it is retained.

14. The vehicle wheel axle assembly according to claim 1, wherein said engagement element is threadably assembled to the axle sleeve or the control shaft to which it is axially retained.

15. The vehicle wheel axle assembly according to claim 1, wherein at least one of said axle sleeve and said control shaft includes a circumferential groove, and wherein said engagement element is axially retained to said circumferential groove.

16. The vehicle wheel axle assembly according to claim 1, wherein at least one of said axle sleeve and said control shaft includes a radially extending recess, and wherein said engagement element is axially retained to said radially extending recess.

17. The vehicle wheel axle assembly according to claim 1, wherein said first engagement surface is radially fixed relative to said axle sleeve and said second engagement surface is radially fixed relative to said control shaft such that said engagement interface is maintained at said axially engaged position.

18. The vehicle wheel axle assembly according to claim 1, wherein at least one of: (i) said engagement element is axially retained to said axle sleeve, including a generally fixed axial distance between said first engagement surface and said first end face; and (ii) said engagement element is axially retained to said control shaft, including a generally fixed axial distance between said second engagement surface and said engagement end.

19. The vehicle wheel axle assembly according to claim 1, wherein said opening includes a first opening portion axially proximal said first end face and a second opening portion axially inboard of said first opening portion, wherein said first opening portion is radially outward of said second opening portion, and wherein said first engagement surface is in the transition between said first opening portion and said second opening portion.

20. The vehicle wheel axle assembly according to claim 19, wherein said first opening portion is a counterbore extending axially inwardly from said first end face.

* * * * *